(12) United States Patent
Moore et al.

(10) Patent No.: US 12,136,439 B2
(45) Date of Patent: Nov. 5, 2024

(54) COMPOSITE VIDEO COMPETITION

(71) Applicant: EXA Properties, L.L.C., Ames, IA (US)

(72) Inventors: John Richard Moore, Ames, IA (US); Timothy James Knipper, Moline, IL (US); Jason Daniel Allen, North Liberty, IA (US); Steven Richard Fishwild, Dubuque, IA (US)

(73) Assignee: MeshPro Sports LLC, Ames, IA (US)

( * ) Notice: Subject to any disclaimer, the term of this patent is extended or adjusted under 35 U.S.C. 154(b) by 68 days.

(21) Appl. No.: 18/087,975

(22) Filed: Dec. 23, 2022

(65) Prior Publication Data

US 2023/0125663 A1     Apr. 27, 2023

Related U.S. Application Data

(63) Continuation-in-part of application No. 17/308,707, filed on May 5, 2021, now Pat. No. 11,570,511.

(60) Provisional application No. 63/021,065, filed on May 6, 2020.

(51) Int. Cl.
  *G11B 27/031*   (2006.01)
  *G06V 20/40*    (2022.01)
  *H04N 21/44*    (2011.01)

(52) U.S. Cl.
  CPC .................................. *G11B 27/031* (2013.01)

(58) Field of Classification Search
  CPC ........... G11B 27/031; H04N 21/44016; H04N 21/812; G06V 20/42; G06V 20/47
  See application file for complete search history.

(56) References Cited

U.S. PATENT DOCUMENTS

| | | | |
|---|---|---|---|
| 6,434,622 B1 | 8/2002 | Monteiro et al. |
| 8,187,070 B2 | 5/2012 | Fleischman |
| 8,272,961 B2 | 9/2012 | Busey et al. |
| 8,328,644 B2 | 12/2012 | Busey et al. |
| 8,342,931 B2 | 1/2013 | Fleischman |
| 8,949,895 B2 | 2/2015 | Shanks |
| 9,032,465 B2 | 5/2015 | Perlman et al. |

(Continued)

FOREIGN PATENT DOCUMENTS

| | | |
|---|---|---|
| EP | 2815557 | 3/2018 |
| WO | WO2011004381 | 1/2011 |

(Continued)

OTHER PUBLICATIONS https://www.youtube.com/watch?v=_QZHGC7-Y9g, Highlight Heaven, Jan. 20, 2018.

(Continued)

*Primary Examiner* — Nnenna N Ekpo
(74) *Attorney, Agent, or Firm* — Rathe Lindenbaum LLP

(57) ABSTRACT

A method may include serially joining different video clips from videos of different historical competitions to form a composite video competition, the different video clips comprising an indeterminate subset of clips drawn from a larger pool of clips, wherein each clip from a historical competition has an associated partial result contribution to a final result of the historical competition further include presenting a result during the composite video competition, the result comprising a linked combination of the partial result contributions from the different video clips.

16 Claims, 21 Drawing Sheets

(56) References Cited

U.S. PATENT DOCUMENTS

| | | | |
|---|---|---|---|
| 9,108,107 B2 | 8/2015 | Perlman et al. | |
| 9,138,652 B1 | 9/2015 | Thompson et al. | |
| 9,723,042 B2 | 8/2017 | Damola | |
| 10,052,556 B2 | 8/2018 | Perlman et al. | |
| 10,293,260 B1 | 5/2019 | Evans | |
| 10,293,263 B2 | 5/2019 | Thompson et al. | |
| 10,417,500 B2 | 9/2019 | Ray et al. | |
| 10,419,790 B2 | 9/2019 | Gersten | |
| 10,460,177 B2 | 10/2019 | Chan et al. | |
| 10,478,730 B1 | 11/2019 | Burnett | |
| 10,521,671 B2 | 12/2019 | Chang et al. | |
| 10,536,758 B2 | 1/2020 | Packard et al. | |
| 10,569,180 B2 * | 2/2020 | Croci | A63F 13/792 |
| 10,832,057 B2 | 11/2020 | Chan | |
| 10,943,125 B1 | 3/2021 | Evans | |
| 2006/0190964 A1 | 8/2006 | Eldering | |
| 2009/0149248 A1 | 6/2009 | Busey et al. | |
| 2009/0203412 A1 * | 8/2009 | Gedling | A63F 13/30 463/43 |
| 2013/0324247 A1 | 12/2013 | Esaki | |
| 2014/0325568 A1 | 10/2014 | Hoang | |
| 2016/0119262 A1 | 4/2016 | Siegel | |
| 2016/0249116 A1 | 8/2016 | Harb | |
| 2016/0271501 A1 * | 9/2016 | Balsbaugh | A63F 13/65 |
| 2016/0365121 A1 | 12/2016 | DeCaprio | |
| 2017/0099334 A1 | 4/2017 | Zalcman et al. | |
| 2017/0220568 A1 | 8/2017 | Dombrowski et al. | |
| 2017/0228600 A1 | 8/2017 | Syed et al. | |
| 2018/0132011 A1 | 5/2018 | Shichman et al. | |
| 2018/0161680 A1 | 6/2018 | Thompson et al. | |
| 2018/0330574 A1 | 11/2018 | Wright et al. | |
| 2019/0141383 A1 | 5/2019 | Kageyama et al. | |
| 2019/0197316 A1 | 6/2019 | Bornfreedom | |
| 2019/0354765 A1 | 11/2019 | Chan et al. | |

FOREIGN PATENT DOCUMENTS

| | | |
|---|---|---|
| WO | WO2018208384 | 11/2018 |
| WO | WO2020154425 | 7/2020 |
| WO | WO2020168434 | 8/2020 |

OTHER PUBLICATIONS https://www.youtube.com/watch?v=sf-Y8p1xct4, Paige Findlay, Jan. 6, 2016.

Antonio Tejero-de-Pablos et al., Summarization of User-Generated Sports Video by Using Deep Action Recognition Features, IEEEXplore, Jan. 15, 2018.

Be more efficient and save time with Spiideo Smart Clip Collections; https://www.spiideo.com/smart-clip-collections-spiideo/; accessed May 5, 2021.

PCT International Search Report for PCT/US2021030934 dated Aug. 12, 2021.

P215450WOEP Examination Report dated Mar. 12, 2024.

* cited by examiner

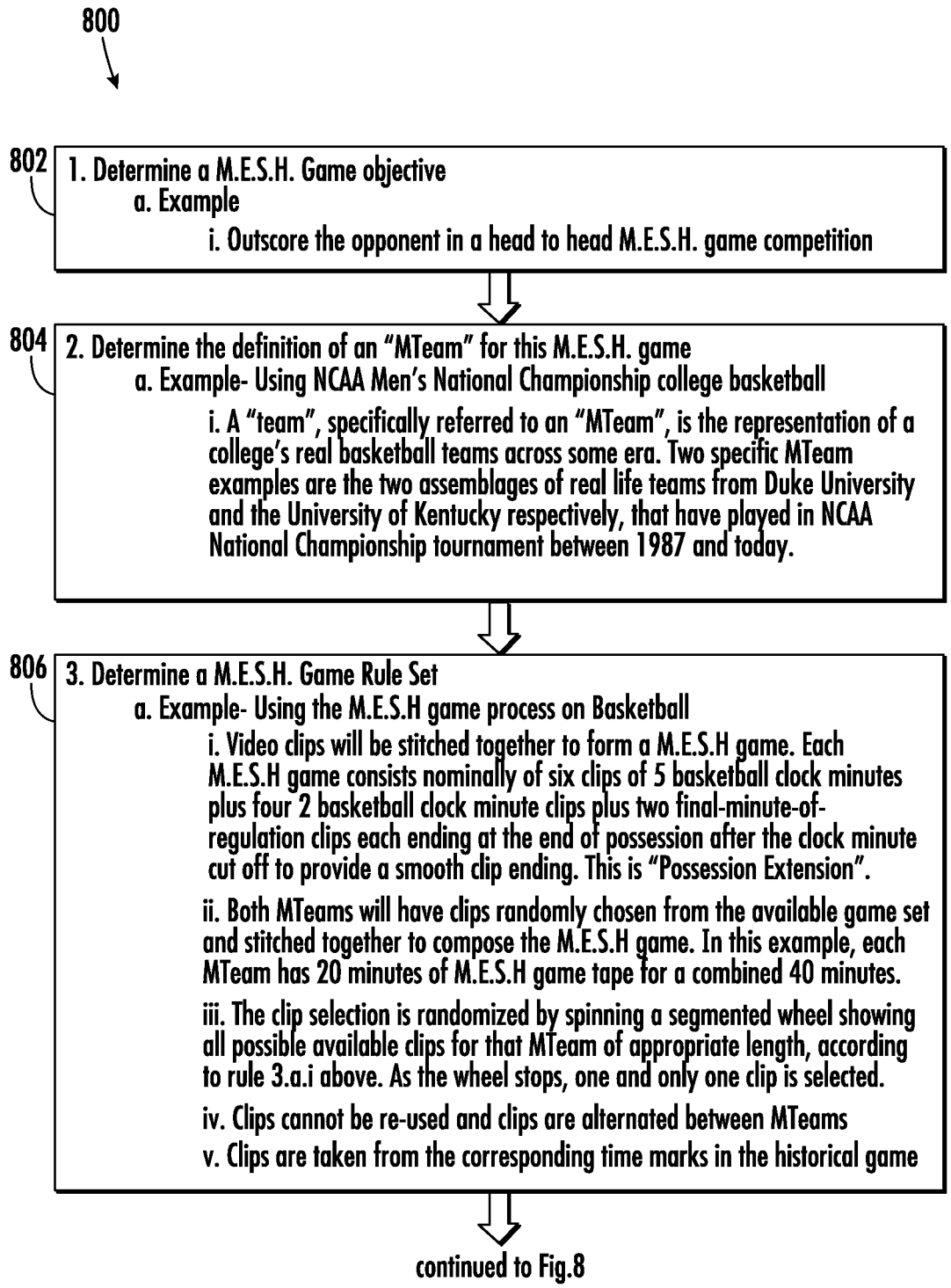

800

802 1. Determine a M.E.S.H. Game objective
  a. Example
    i. Outscore the opponent in a head to head M.E.S.H. game competition

804 2. Determine the definition of an "MTeam" for this M.E.S.H. game
  a. Example- Using NCAA Men's National Championship college basketball
    i. A "team", specifically referred to an "MTeam", is the representation of a college's real basketball teams across some era. Two specific MTeam examples are the two assemblages of real life teams from Duke University and the University of Kentucky respectively, that have played in NCAA National Championship tournament between 1987 and today.

806 3. Determine a M.E.S.H. Game Rule Set
  a. Example- Using the M.E.S.H game process on Basketball
    i. Video clips will be stitched together to form a M.E.S.H game. Each M.E.S.H game consists nominally of six clips of 5 basketball clock minutes plus four 2 basketball clock minute clips plus two final-minute-of-regulation clips each ending at the end of possession after the clock minute cut off to provide a smooth clip ending. This is "Possession Extension".
    ii. Both MTeams will have clips randomly chosen from the available game set and stitched together to compose the M.E.S.H game. In this example, each MTeam has 20 minutes of M.E.S.H game tape for a combined 40 minutes.
    iii. The clip selection is randomized by spinning a segmented wheel showing all possible available clips for that MTeam of appropriate length, according to rule 3.a.i above. As the wheel stops, one and only one clip is selected.
    iv. Clips cannot be re-used and clips are alternated between MTeams
    v. Clips are taken from the corresponding time marks in the historical game continued to Fig.8

FIG. 8 continued from Fig.8

808 — 4. Determine a M.E.S.H. game Scoring Methodology
  a. Example- Using Basketball Example in previous step
    i. This M.E.S.H. game uses Crossover scoring as following:
      1. All points scored during each MTeam's 20 minutes of M.E.S.H. game tape count towards that MTeam's final score. All points scored by the MTeam's opponents in its clips, are awarded to the opposing MTeam. This results in realistic scores mirroring real games.
    ii. Ties are broken by coin flip

810 — 5. Choose MTeams to compete having available historical footage
  a. Example
    i. MTeams are any two teams from the assemblage in step 2
      1. University of Kentucky & Duke University are examples
    ii. Footage required would be NCAA National Championship Tournament games played on or after 1987 showing these MTeams

812 — 6. Procure historical footage showing real games
  a. Example
    i. Procure footage from all games in previous step (5.a.ii)

814 — 7. Divide historical footage into discrete clips
  a. Example- based on basketball clock time
    i. Each historical footage game tape is divided per the rule in 3.a.i in this figure.

continued to Fig.8

FIG. 8 continued from Fig.8

816 — 8. Create the M.E.S.H. game content
  a. Example- based on basketball example from previous steps in this figure
   i. Video clips are stitched together consecutively to form new content resulting in a new M.E.S.H. game. In this example, each MTeam would have 20 minutes of M.E.S.H. game tape for each M.E.S.H. game for a combined total of 40 minutes for both MTeams.
   ii. Random clip selection and other Rules are applied as per the Game Rule Set in Step 3 in this figure
   iii. Scoring is applied as per the Scoring Methodology in Step 4 in this figure
   iv. The process is run on live television with on-air announcers

818 — 9. Organize M.E.S.H. games into tournament format (optional)
  a. Example- based on basketball example from previous steps
   i. 64 MTeam single elimination bracket resulting in a tournament winner
    1. 64 MTeams, each representing a single college, are chosen from the list of colleges with the most NCAA Tournament wins since 1987.
    2. M.E.S.H. games are organized into a standard 64 team, single elimination bracket, seeded by a selection committee

820 — 10. Distribute content or results to consumers
  a. Example- based on basketball example from previous steps
   i. After steps 1 through 7 are complete, a live television broadcast is produced and distributed starting at step 8 in this figure.
   ii. Commercial breaks are inserted at appropriate times
   iii. A custom scoreboard overlay tracks the MGame score for both MTeams
   iv. Announcers spins the clip selection random wheel discussed in step 3.a.iii

END OF PROCESS

FIG. 8

COMPOSITE VIDEO COMPETITION

CROSS-REFERENCE TO RELATED PATENT APPLICATIONS

The present application is a continuation-in-part patent application claiming priority from non-provisional patent application Ser. No. 17/308,707 filed on May 5, 2021 and entitled COMPOSITE VIDEO COMPETITION which claims priority under 35 USC § 119 from U.S. Provisional Patent Application Ser. No. 63/021,065 filed on May 6, 2020 by Moore et al. and entitled Method for Creating Simulated Game Content with an Unknown Outcome by Splitting, Reassembling, and Scoring Historical Video Content, the full disclosure of which is hereby incorporated by reference.

BACKGROUND

Competitions between different teams or different individuals may come in a variety of different forms. Examples of competitions between different teams include, for not limited to, basketball games, football games, baseball games, hockey games, soccer games and the like. Some competitions are more individualistic such as tennis matches, golfing events, races, and the like. Such competitions are often recorded as videos. Such videos may be later viewed in whole or in part. In some circumstances, selected portions of the videos, clips, are later replayed as highlights or as part of documentaries regarding the competition or participants in the competition.

BRIEF DESCRIPTION OF THE DRAWINGS

FIG. 8 is a flow diagram illustrating an example method forming of an example composite video competition/M.E.S.H. game pursuant to the method of FIG. 7.

FIG. 9 shows the beginning of an example opening clip in the example M.E.S.H. game matching ISU VS UNI with MTeam ISU in possession of the clip vs North Dakota State Bison from 2017.

FIG. 10 illustrates the end of the example opening clip in the example M.E.S.H. game matching ISU VS UNI with ISU in possession of the clip vs North Dakota State Bison from 2017.

FIG. 11 illustrates an example dark screen clip change transition from the opening clip (ISU) to the second clip (UNI)

FIG. 12 illustrates the beginning of an example second clip in the example M.E.S.H. game matching ISU VS UNI with UNI in possession of the clip vs Colorado State Rams from 2017.

FIG. 13 illustrates an example commercial break feature.

FIG. 14 illustrates the end of the example second clip in an M.E.S.H. game matching ISU VS UNI with MTeam UNI in possession of the clip vs Colorado State Rams from 2017.

FIG. 15 illustrates a different example clip change transition to go to a live studio shot for clip selection.

FIG. 16 illustrates an example clip selection spinning wheel random clip selector while it is spinning.

Figure 1:
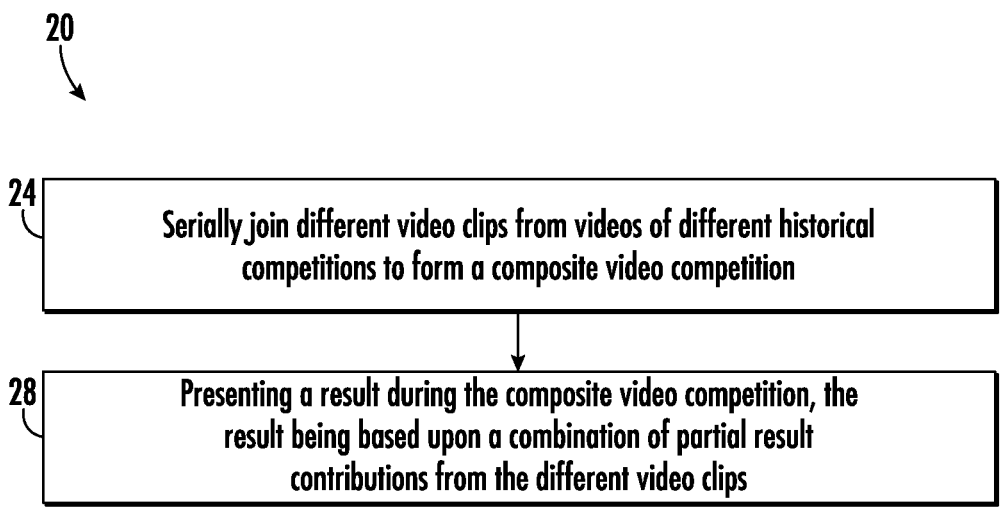
FIG. 1 is a flow diagram of an example method for forming a composite video competition.

Throughout the drawings, identical reference numbers designate similar, but not necessarily identical, elements. The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed is an example method for forming a composite video competition by serially concatenating clips from different videos of different historical competitions. Disclosed is an example composite video competition which comprises a series or concatenation of clips from different videos of different historical competitions. The composite video competition provides a viewer with a video of an indeterminate outcome for a competition between two participants, whether the two participants be teams or individuals. The composite video is composed of real-life clips taken from videos (also referred to as live footage) of different historical competitions and linked together to form a running video of the competition. The videos may also originate from non-real life competitions such as E-sports, video game competitions, or any other video source. The chain or series of individual clips along with their different original or historical partial result contributions are combined to generate new final total composite result (score) for the composite video competition. As a result, new videos of competitions may be generated from historical videos of competitions for consumption by viewers.

The example composite video competitions are not merely video highlights of a single competition or highlights of multiple competitions. The example composite video competitions are not merely a documentary using historical video clips. The example composite video competitions are not merely a simulation of possible outcomes taken from historical competition statistics. The example composite video competitions are not merely an overlay of historical video clips. In contrast, the example composite video competitions is an entirely new video of an entirely new competition generated from the serial linking or chaining of different segments of prior historical competitions end-to-end, directly, or indirectly, wherein the final result of the composite video competition (such as the final score) is a combination of the partial historical contributions of the individual segments of the different historical competitions.

The disclosure describes a process for producing performance-based simulations comparing arbitrary assemblages of individuals and teams to form new, distinct "teams". These new "teams" should then compete across arbitrary eras in a format that produces an unknown outcome until the end of that simulation.

Furthermore, the disclosure describes a process for the new "teams" to compete not only in single game competitions but in various tournament formats to determine a tournament winner, all while having an unknown outcome at the onset of the individual game competitions, and an unpredictable outcome till near, or at, the tournament's conclusion.

Furthermore, the disclosure describes a process that creates a vehicle for highlighting former players, opponents, coaches, broadcasters, and staff shown in, or involved with historical sports footage.

Furthermore, the disclosure describes a process that produces performance-based simulations in a given sport that is capable of handling team or individual sports, multidirectional, unconstrained paths, and function in any venue, across any era for which historical footage is available. This is also extensible to events that may not be considered conventional sports.

Furthermore, the disclosure describes a process that allows for updating old content with new commercial or informational content which may include any additions, deletions, or edits to the audio portion of the video.

The disclosure describes a process that slices existing historical footage into segments, reassembles those slices in a novel and flexible manner, applies scoring, and produces new, monetizable content. This content is referred to as a Mixed Event from Sports History game, abbreviated interchangeably as a M.E.S.H. game or simply MESH game. The M.E.S.H. game process is ideal for creating assemblages of players and individuals to form new "teams". Furthermore, the process allows these "teams" to simulate competitions across arbitrary eras or events. Since each M.E.S.H. game is unique, fans will be unaware of the outcome at its onset, and the outcome would remain mathematically unpredictable until at least the last reassembled clip, and with some minor enhancements, would remain unknowable until the MESH game conclusion, mirroring the unpredictability of a real-life game.

Disclosed is a process that comprises the following steps: Determine a M.E.S.H. Game objective; Determine the definition of an "MTeam"; Determine a M.E.S.H. Game Rule Set; Determine a Game Scoring Methodology; Choose MTeams to compete having available historical footage; Procure historical footage showing real games; Divide historical footage into discrete clips; Create new MESH Game content by reassembling previously divided footage and applying both the previously determined Game Rule Set and the previously determined Scoring Methodology; Optionally organize multiple M.E.S.H. games into a tournament format; Distribute new M.E.S.H. game content to consumers for viewing either live or on-demand.

The disclosed method is unique when compared with other known processes and solutions in that it creates entirely new visual content containing a competitive element with an unknown outcome to the viewer from previously archived material across virtually any sport or video-based activity, regardless of event type or player directionality, footage, age, or venue. Furthermore, it allows competition amongst arbitrary teams across arbitrary eras, playing nearly any sport, using a visual representation that displays, and thereby monetizes, large amounts of historical footage.

The disclosure relates generally to a process for creating simulated game content with an unknown outcome by splitting, re-assembling, and scoring historical video content. More particularly, the disclosure relates to a process whereby historical video content is sliced into segments and for two or more competing entities, serially reassembled in a novel manner to create a composite video, using a predefined rule set and predefined scoring set, to form new content that emulates a real-life game. The resulting content is then distributed to viewers for consumption. The process is called the Mixed Events from Sports History process which is abbreviated as the M.E.S.H. process or alternatively, the MESH process. The resulting newly created content is termed a M.E.S.H. game. Due to the novel clip reassembly and scoring processes, the final score of M.E.S.H. games cannot be mathematically known to viewers until the very last clip is reached in the most basic embodiment of the process. With other process options, including Live Scoring Insertion, the outcome can be made completely mathematically indeterminate until the conclusion of the broadcast, emulating the tension and drama of a real-life game. The resulting M.E.S.H. content can then be packaged, with other monetizable assets, such as ads, and ultimately consumed by viewers.

For the purposes of this specification, the terms "historical video", "historical footage", "archived video", and "archived footage" can be used interchangeably, to generally refer to video footage of "original recordings of real-life events showing real life participants and scenes that were filmed independently and prior to this M.E.S.H. game". In the event that the M.E.S.H. process was being used to MESH a non-real-life event, for example a previous video game tournament in Electronic Sports, "archived video" would still refer to the "original recordings of the event and scenes that were filmed independently and prior to this M.E.S.H. game", not the M.E.S.H. game video constructed later and independent of the original event.

For purposes of this disclosure, the following terms are defined thusly:

A "Participant" is an MTeam or a member of an MTeam. A participant may or may not be present in a given action clip.

A "Competitor" is the opposing team shown in a given clip that is playing against an MTeam. The "Competitor" is generally not an MTeam member, except in the rare case where two MTeam's would happen to play each other in a video clip A "Running Score" is the point tally that changes over time for a given MTeam as per the Scoring methodology applied to the M.E.S.H. game.

The "Duration" of a given video clip is the physical length of the clip from start to finish. Duration may be measured in real time minutes, or by some time metric inside the video like for instance, a game clock. However, clip duration may be dictated by metrics wholly unrelated to time, for example, a possession in an American football game.

FIG. 1 is a flow diagram illustrating an example method 20 forming or generating a composite video competition. As indicated by block 24, different video clips from videos of different historical competitions are serially joined to one another, concatenated, to form a composite video competition. A historical competition may be in the form of a game between different teams. For example, video competition may be an American football game (hereinafter referred to as "football"), a basketball game, a soccer game, a volleyball game, a rugby game, a baseball game, and the like. A historical competition may be in the form of a game or match between individuals such as a golf match, a tennis match, a car race, a track event, or the like. The videos of the competitions are historically recorded, wherein segments or clips are generated from the larger overall video. The segments are clips representing less than whole portions of the larger video. For example, a clip may comprise a video clip of a period of time during the competition such as two minutes during a basketball game, soccer game, football game or the like. The clip may comprise a predefined segment of the competition such as a video clip of a down or a series of downs in a football game, an at-bat in a baseball cane, an inning in a baseball game, a possession in a basketball game or the like. The clips that form the composite video competition are taken from multiple prior competitions.

Although the video competition may be between two participants or Mteams, in some implementations, the video clips may be of prior competitions that involve only one of the two participants. For example, one of the video clips forming the composite video competition may be taken from a first prior video of a prior competition between the two participants. Another of the video clips forming the composite video competition may be taken from a prior video of a competition between a first one of the two participants and a competitor who is not one of the two participants. Another of the video clips forming the composite video may be taken from a prior video of a competition between a second one of the two participants and a competitor who is not one of the two participants. The competitors themselves may be different. For example, a first one of the video clips forming the composite video competition may be a video clip taken from a video of a prior competition between a first one of the two participants and a first competitor (who is not one of the two participants) while a second one of the video clips forming the composite video competition may be a video clip taking from a video of a competition between a second one of the two participants and a second competitor different than the first competitor (who is also not one of the two participants).

As indicated by block 28, a result for the composite video competition is presented during the composite video competition. This result may occur at the end of the composite video competition or in some intermediate point during the composite video competition. The result may be a final score or result or may comprise an ongoing running score. The result may have various forms depending upon the nature of the competition. The result may be a score or a failure. The result may be a competition threshold that may lead to the score or the lack thereof, such as a first down in football or a strikeout in baseball.

The result that is presented is based upon a combination of partial result contributions from the different video clips. A first video clip may have a first associated partial result contribution to the final result of a first prior competition. A second video clip, serially connected to the first video clip, directly or indirectly, may have an associated second partial result contribution to the final result of a second prior competition different than the first prior competition. Although originating from different prior competitions, the first partial result and the second partial result from the first and second video clips, respectively, are combined so as to serve as a basis for the result being presented during the newly generated composite video competition.

By way of example, for a basketball competition, a first video clip from a first prior recorded basketball game may depict a first participant scoring a basket, two points. A second video clip from a second prior recorded basketball game may depict a second participant making a three-point shot. The result presented during the composite video competition between the first participant and the second participant would be based upon the two points scored by the first participant in the first historical competition and the three points scored by the second participant in the second historical competition.

By way of another example, for a football competition, a first video clip from a first prior recorded football game may depict a first participant gaining 4 yards during a run. A second video clip from my prior recorded football game and directly concatenated to the first video clip may depict the first participant gaining 7 yards with a pass. Presuming the state of the composite video competition was first and ten immediately prior to the first video clip, the result presented during the composite video competition between the first participant and the second participant would be a gain of 11 yards and potentially a first down for the first participant.

By way of another example, for a baseball competition, a first video clip from a first prior recorded baseball game may depict a fastball thrown by a first participant pitcher (against a batter of the second participant or a batter of a first competitor) and resulting in a strike. A second video clip from a second prior recorded baseball game may depict a slider thrown by the same pitcher of the first participant (against a batter of the second participant or a batter of the first competitor or a batter of a second different competitor) and resulting in a strike. The result presented during the composite video would be two strikes for the pitcher of the first participant.

By way of another example, for a baseball competition, a first video clip from a first prior recorded baseball game may depict an at-bat of a first player of a first participant hitting a triple against a first competitor. A second video clip from a second different prior recorded baseball game and directly appended or concatenated to the first video clip, may depict an at-bat of a second player of the first participant hitting a homerun against a second different competitor. The result presented during the composite video would be to run scored for the first participant against a second participant. The same would apply when the second participant has an at-bat during an inning. In each of the of examples, this process would continue during the game to result in a final score for the composite video competition.

Figure 2:
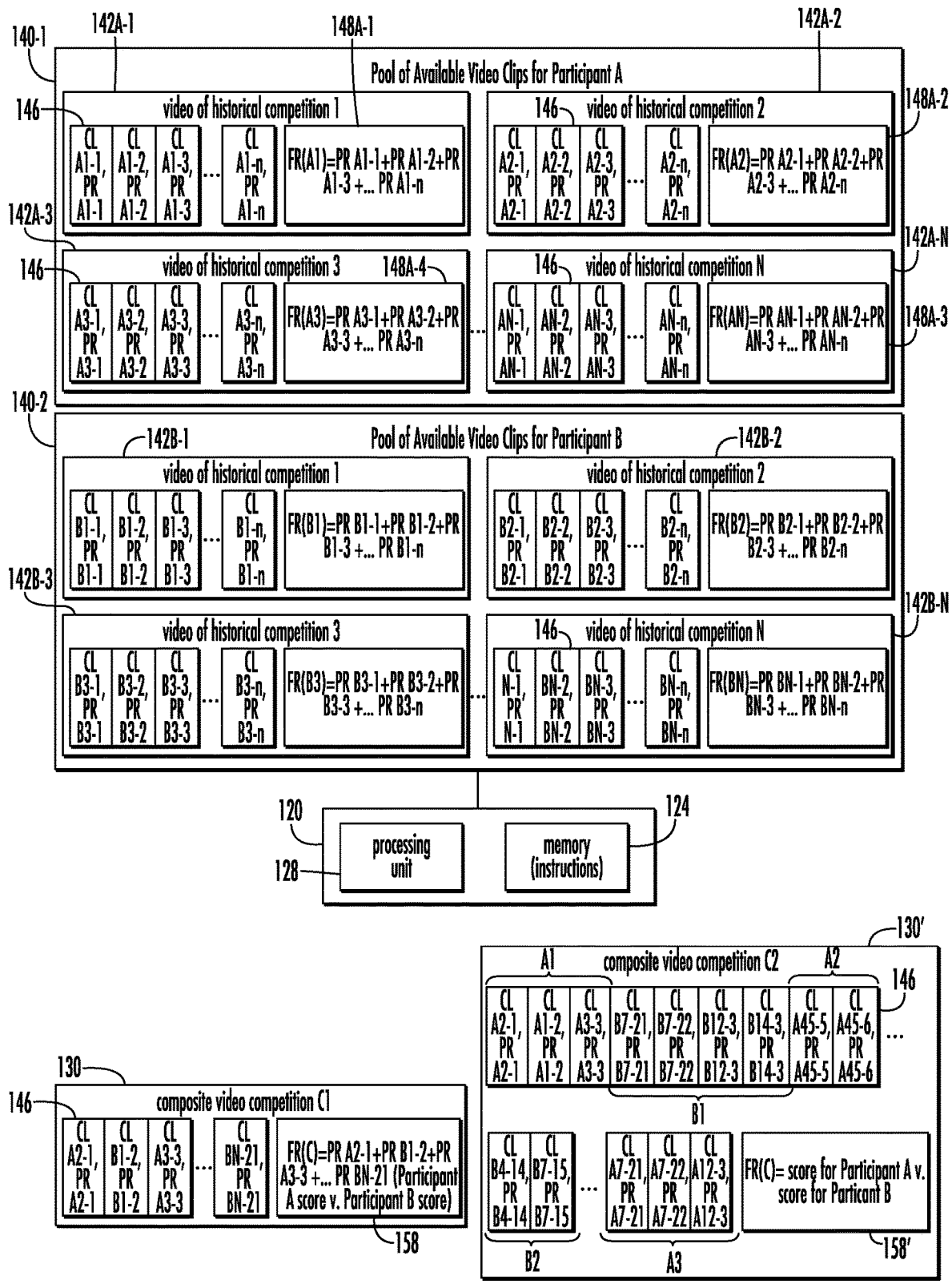
FIG. 2 is a block diagram of an example system for forming an example composite video competition.

FIG. 2 is a block diagram schematically illustrating an example computing system 120 for generating an example composite video competition 130 from example pools 140-1, 140-2 (collectively referred to as pools 140) of available video clips. Pools 140 contain historic videos involving the two participants, Participant A and Participant B (competing individuals or teams) of the composite video competition being generated. Pool 140-1 comprises historical videos of competitions involving Participant A. Pool 140-2 comprises historical videos of competitions involving Participant B.

Pool 140-1 comprises prior videos 142A-1, 142A-2, 142A-3 . . . 142A-n (collectively referred to as videos 142A) of complete or substantially complete historical competitions involving Participant A. Pool 140-2 comprises prior videos 142b-1, 142b-2, 142b-3 . . . 142B-n (collectively referred to as videos 142B) of complete or substantially complete historical competitions involving Participant B. In some implementations, each of the videos 142A and 142B may be pre-sliced or pre-divided into individual video clips 146. In some implementations, computing system 120 may slice or divide the videos 142A and 142B into the individual video clips. In the example illustrated, video 142A-1 comprises video clips A1-1, A1-2, A1-3 . . . A1-n. In the example illustrated, video 142B-1 comprises video clips B1-1, B1-2, B1-3 . . . B1-n. Each of video clips 146 of video 142-A1 has an associated partial result PR for the Participant that contributes to the final result FR 148A-1 for the Participant of the historical composition recorded by video 142A-1. Likewise, each of video clips 146 of video 142-B1 has an associated partial result PR for the Participant that contributes to the final result FR 148B-1 for the Participant of the historical composition recorded by video 142B-1. The same characteristics apply to each of the historical videos 148 contained in pools 140.

By way of example, Participants A and B may be basketball teams. Videos 142 may comprise video recordings of basketball games involving at least one of Participants A and B. The final game score of the historical basketball game captured by video 142A-1 may be Participant A 80 and its competitor 76. Each of the video clips 146 of video 142A-1 are those video clips that depict an offensive possession of Participant A during the game. The final result 148A-1 is a total number of points scored by Participant A, 80 points, during all of its offensive possessions. Each video clip 146 may have an associated partial result PR that contributes to the final result for the Participant. For example, video clip A1-1 may depict a pair free throws made by Participant A against the competitor, video clip A1-2 may depict a two-point basket made by Participant A against the competitor, video clip A1-3 may depict a three-point basket made by Participant A against the competitor, video clip A1-4 may depict a missed three point shot attempt by Participant A against the competitor. Video clips A1-1, A-1-2, A1-3, and A1-4 have partial results of two points, two points, three points and zero points, respectively, which all contributed to the final result of 80 points or Participant A against its competitor. Those video clips or segments in video 142A-1 depicting the offense of possession of the competitor of Participant A are not identified, are not used and/or are discarded.

Likewise, the final game score of the historical basketball game captured by video 142B-1 may be Participant B 66 and its competitor 85. Each of the video clips 146 of video 142b-1 are those video clips that depict an offensive possession of Participant B during the game. The final result 148-B1 is a total number of points scored by Participant B, 66 points, during all of its offensive possessions. Each video clip 146 of video 142B-1 may have an associated partial result PR that contributes to the final result for the Participant B. For example, video clip B1-1 may depict a missed free throw by Participant b against the competitor, video clip B1-2 may depict a two-point basket made by Participant B against the competitor, video clip B1-3 may depict a three-point basket made by Participant B against the competitor, video clip A1-4 may depict a steal and a dunk by Participant B against the competitor. Video clips B1-1, B1-2, B1-3, and B1-4 have partial results of zero points, two points, three points and two points, respectively, which all contributed to the final result of 66 points for Participant B against its competitor. Those video clips or segments in video 142B-1 depicting the offense of possession of the competitor of Participant B are not identified, are not used and/or are discarded. The video clips of the other historical competitions as recorded by videos 142 have similar characteristics.

By way of another example, rather than each of the video clips depicting a particular offensive possession of the Participant, each video 142 of a prior or historical video competition maybe sliced are divided into clips 146, wherein each of clips 146 depicts a particular time-based portion of the competition. For example, each of clips 146 may depict a 30 second interval during the competition. The 30 second interval may include multiple offensive possessions by the Participant. The partial result associated with a particular video clip may be the total number of points scored by the Participant during the 30 second interval. In some implementations, the different video clips 146 of a particular video 142 may have uniform durations. For example, each video clip may be a 30 second portion of the game. In yet other implementations, the different video clips 146 of a particular video 142 may have nonuniform durations. For example, periods of time at the end of a half or the end of a game may be divided into portions or clips of smaller durations.

In some implementations where each video clip may depict a time interval during a historic competition, the partial result for the Participant may contribute to the final total score for the Participant and the partial result of the clip for the competitor or opponent of the Participant in the video clip may contribute to the final or total score for the other Participant in the composite video competition. Under such a scoring method (later referred to as crossover scoring), any points scored by the competitor of the Participant in the video clip would be attributed to the other Participant (who or which is not depicted in the video clip). For example, in a composite video competition (M game) between Participant A and Participant B, a video clip of a historical competition between Participant A and a competitor C may depict Participant A scoring five points and may depict competitor C (which is not Participant B) scoring three points. With crossover scoring, the final score (and running score) of Participant A would be based upon the five points scored in the video clip and the final score (and running score) of Participant B would be based upon the three points scored by Competitor C in the video clip.

Computing system 120 carries out method 20 to generate the composite video competition 130. Computing system 120 comprises memory 124 and processing unit 128. Memory 124 comprises a non-transitory computer-readable medium containing instructions for directing processing unit 128 to carry out method 20. Such instruction may be stored on nonvolatile memory such as a disk or a solid-state memory or flash memory. Such instructions may direct processing unit 128 to serially join or concatenate different video clips 146 from different videos 142 of different historical competitions to form a composite video of a new generated competition between two participants (as described above with respect to block 24). Such instruction may further direct processing unit 128 to present (display) a result during the composite video competition, wherein the result is based upon a combination of the partial result contributions from the different video clips 146 (as described above with respect to block 28).

The example composite video competition 130 generated by computing system 120 is composed of or comprises a series of concatenated video clips 146 of portions of different historical games or competitions, wherein the partial results of the individual clips are combined to produce a new different result (score) for the composite video competition. In the example, composite video competition 130 comprises a concatenation of video clips A2-1, B1-2, A3-3 . . . BN-21 taken from videos 142A-1, 142B-2, 142A-3 . . . 142B-N of pools 140. In the example illustrated, clips 146 involving Participants A and B are alternated in the composite video competition 130. In some implementations, the clips 146 may be individual offensive possessions of Participants A and B. For example, an at-bat for a baseball team, a basketball possession, a football possession on the like (multiple downs). In other implementations, the clips may be predefined periods of time or portions (a quarter, two minutes, or the like) of the prior historical competitions recorded in videos 142. The final result FR(C) 158 for the composite video competition 130 is based upon a combination of the partial results for each of the concatenated clips 146. The final result for Participant A is the sum of the partial result for those clips involving Participant A. The final result for Participant B is a sum of the partial results for those clips involving Participant B. The final result FR(C) 158 for the competition 130 may be a comparison of the final results for Participants A and B. For purposes of this disclosure, presenting a result during a composite video competition includes a result presented at the "end of" a composite video competition.

In some implementations, computing system 120 randomly selects the video clips 146 that form the composite video competition 130. In some implementations, computing system 120 selects the video clips 146 that form the composite video competition 130 based upon default or user supplied criteria, biases, or handicapping. In some implementations, as the composite video of competition 130 is being generated, and prior to completion of the composite video clip 130, users/viewers may spin a wheel, roll of a dice, or otherwise participate in the random selection of the next video clip to be appended to the current ongoing string of video clips forming the composite video competition 130. In some implementations, as the composite video of competition 130 is being generated, and prior to completion of the composite video clip 130, users/viewers participate in the selection of the next video clip using a non-random method where, for instance they are a celebrity, they select a video to be appended to the current ongoing string of video clips forming the composite video competition 130.

As further shown by FIG. 2, depending upon the nature of the competition, individual video clips may depict portions of an offense of possession or a defensive role by Participant. In such implementations, multiple video clips of a single Participant may be directly concatenated to form a set of video clips involving one of the Participants in the composite video competition, wherein sets of video clips for the different Participants are alternated.

For example, a football possession may be broken down into individual downs or plays, wherein each video clip in the set of clips for the Participant depicts a particular play or down for the Participant during this series of downs representing the football possession. The partial result of each video clip depicting the play or down is the net yardage gain or loss for the down or a score. The football possession (set of clips) may end with a final clip of the set depicting a change in possession such as with a score (touchdown or field-goal) a punt, or a turnover such as a fumble, and interception or a turnover on downs.

A baseball possession, a Participant's portion of an inning, may be broken down into individual batters, wherein each video clip in the set of clips for a Participant depicts the at-bat for an individual batter. The partial result of each video clip is a hit (single, double, triple or homerun), bunt, sacrifice or out for that individual batter. The partial result for the Participant's portion of an inning may be any score that occurred during the portion of the inning. The set of clips depicting the Participant's portion of an inning may end following a final clip depicting a third out.

A baseball possession may be broken down further, wherein each individual at-bat of an individual batter may be divided into individual pitches, wherein each video clip in the set of clips for participant depicts an individual pitch against an individual batter of the Participant. The partial result of each video clip is a strike, ball, hit, bunt, sacrifice or out. The set of clips representing an at-bat for an individual batter of the Participant may end following a final clip depicting a third strike, a hit/bunt/sacrifice or an out. The partial results of the individual clips in a particular set are combined to determine the partial result for the set of clips. The partial results for the multiple sets of clips for a Participant are combined to determine the overall or final result for the competition for the Participant.

For example, in a football game, the partial result of individual plays may result in yardage gains, changes in field position and possibly a first down which extends the set of clips. The total yardage gain and field position change as new clips are added. The sum of the clips may result in a field position or yardage gain such that a touchdown or field-goal results.

FIG. 2 further illustrates a composite video competition 130' which comprises a first set of video clips A1 for Participant A, a second set of video clips B1 for Participant B and directly appended to Set A1, a third set of video clips A2 for Participant A, fourth set of video clips B2 for Participant B and so on ending with a final set of clips A3 for Participant A. As shown by FIG. 2, the number of clips in each set may vary. The final result 158' for the competition may be the score for Participant A determined based upon the individual partial results for the individual sets for Participant A which in turn are based upon the individual results for the individual clips of the particular set. The final result 158' for the competition for Participant B may be the score for Participant B determined based upon the individual partial results for the individual sets for Participant B which in turn are based upon the individual results for the individual clips of the particular set.

Figure 3:
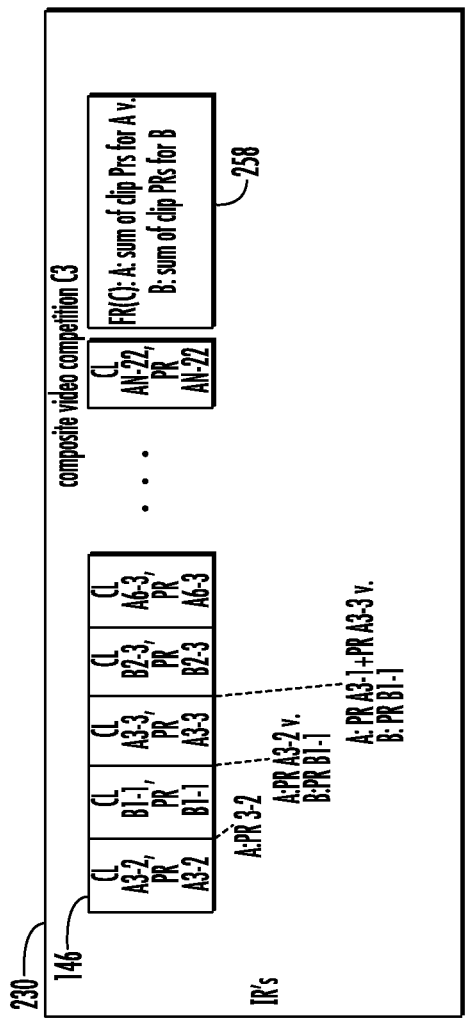
FIG. 3 is a block diagram schematically illustrating an example composite video competition.

FIG. 3 is a block diagram illustrating portions of an example composite video competition 230 which may be generated by computing system 120 from the pools 140 of available video clips for the two Participants A and B in the composite video competition. Composite video competition 230 is similar to composite video competition 130 described above except that composite video competition 230 is specifically illustrated as presenting intermediate results (IR's) during the composite video 230. In some implementations, these intermediate results may be presented as a running score overlaid on top of the video clips being presented. Each running score is the current sum of the partial results up to that point in time for the composite video competition 230 for those clips for Participant A versus the current sum of the partial results up to that point in time for the composite video competition 230 for those clips of Participant B.

In the example illustrated, following the completion of clip CL A3-2, computing system 120 overlays the partial results PR A3-2 for Participant A, the partial results associated with what was depicted in the video clip CL A3-2. Following the completion of video clip CL B1-1, computing system 120 adds the partial results PR B1-1 to the running score for Participant B. Following the completion of video clip CL A3-3, computing system 120 adds the partial results PR A3-3 for that video clip A3-3 to the earlier ongoing intermediate result for Participant A. Following the presentation of video clip CL A3-3, the running score indicates that Participant a has a current result (score, field position, on base) of PR A3-1+PR A3-3 while Participant B has a current result of PR B1-1. The presentation or overlaying of running scores on top of the video clips continues throughout the composite video competition 230 until the final result 258 is presented at the end of the competition 230. The final result 258 will overlay a total score for Participant A versus the total score for Participant B. The total score for each of the Participants in the sum of the partial results of the various clips for the particular Participant.

Figure 4:
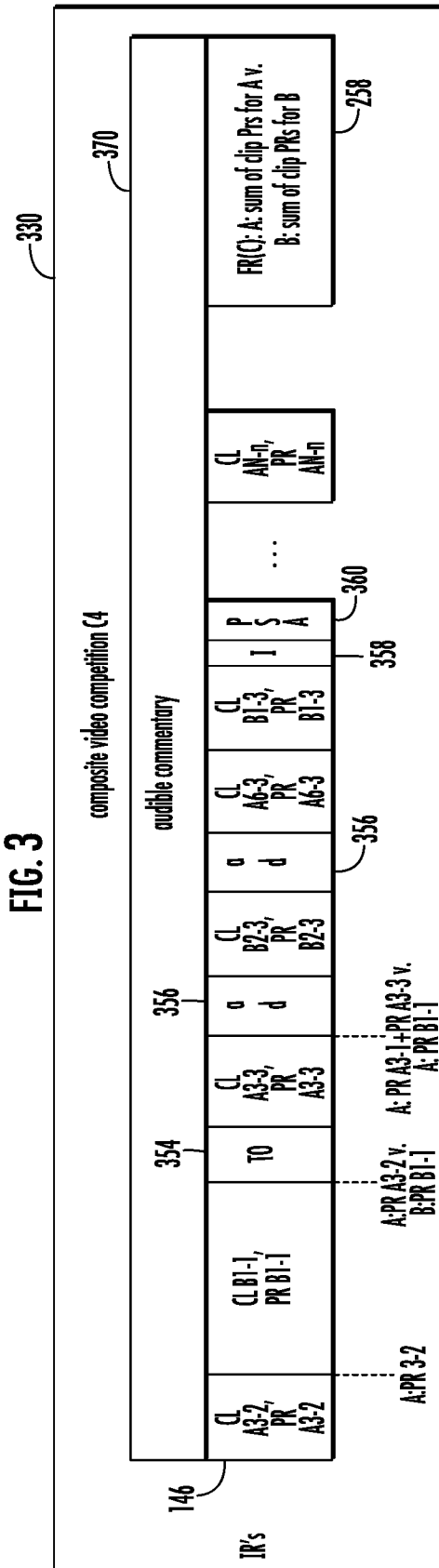
FIG. 4 is a block diagram schematically illustrating an example composite video competition.

FIG. 4 is a block diagram schematically illustrating another example composite video competition 330 that may be generated by computing system 120 from the pools 142 available video clips for Participants A and B. The generated composite video competition 330 is similar to composite video competition 230 except that composite video competition 330 additionally comprises video inserts in the inserted by computing system 120 between or amongst the various video clips 146. Examples of such video inserts include, but not limited to, commercials or ads, timeouts, public service announcements and other information.

In the example illustrated, computing system 120 inserts a timeout video insert 354 between video clips CL B1-1 and CL A3-3. Computing system 120 inserts a commercial or ad 356 between video clips CL A3-3 and CL B2-3, and also between video clips CL B2-3 and CL A6-3. An information video 358 and a public service announcement video 360 are inserted following clip CL B1-3. The insertion of the ad videos facilitates monetization of the generated composite video competition 330. The insertion of the information video 358 and public service announcement 360 further facilitate the communication of information to those viewers of composite video competition 330. During the timeout video 354, current statistics in the form of a video or graphic regarding Participant A and Participant B may be presented.

As further shown by FIG. 4, in some implementations, computing system 120 additionally overlays or provides audible commentary 370. Audible commentary 370 may include the running score as well as exhortations regarding what is being presented by the current video clip. Such audible commentary may comprise audible commentary extracted from the original historical competition from which the clip was taken or may comprise prerecorded original audible commentary stored in memory 124 and selectively inserted or added by computing system 120 given what is being presented by the particular clip or what has been presented by the prior video clips. Such commentary may additionally provide side stories regarding the players, coaches and/or histories of the Participants.

Figure 5:
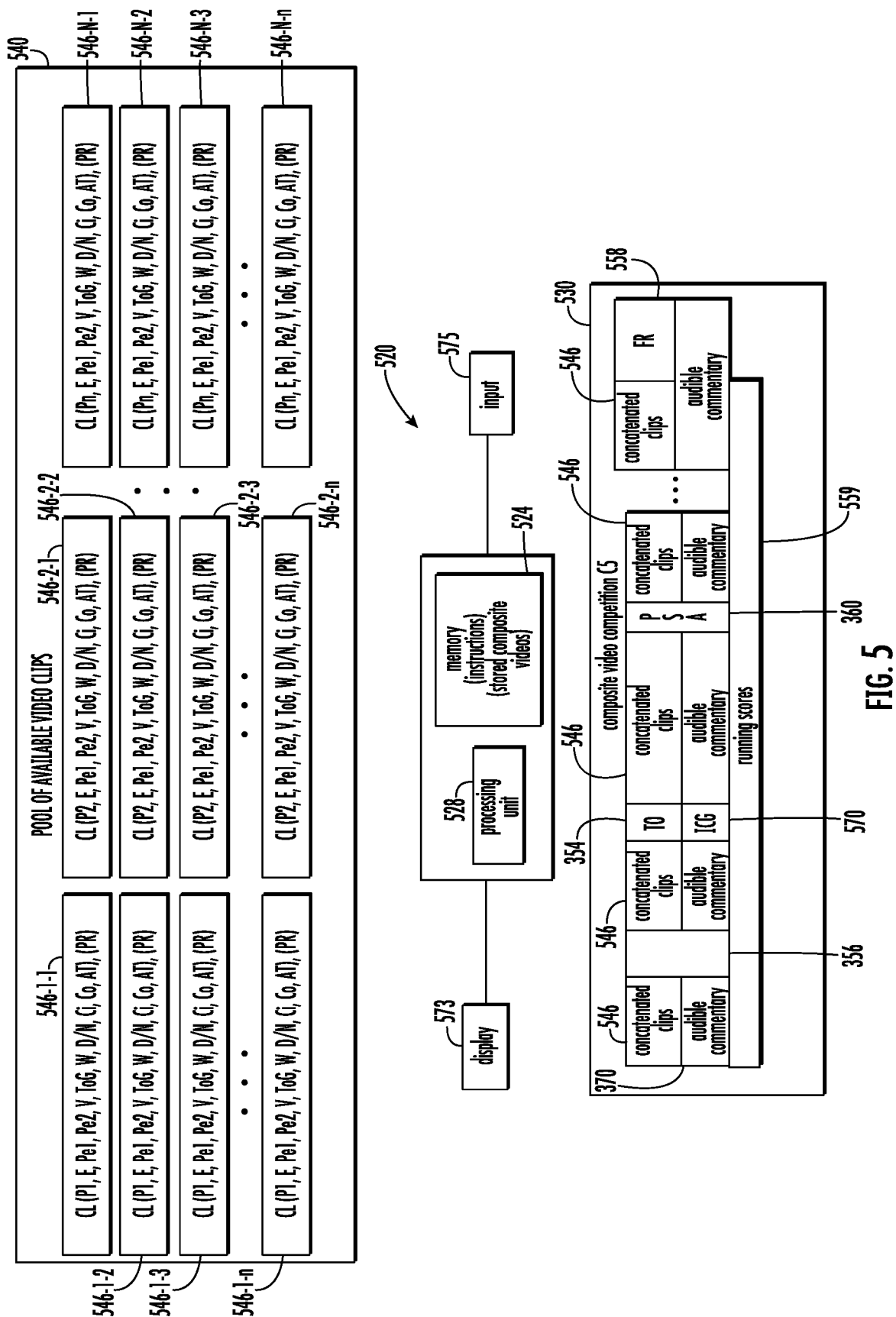
FIG. 5 is a block diagram schematically illustrating an example system for forming an example composite video competition.
Figure 6:
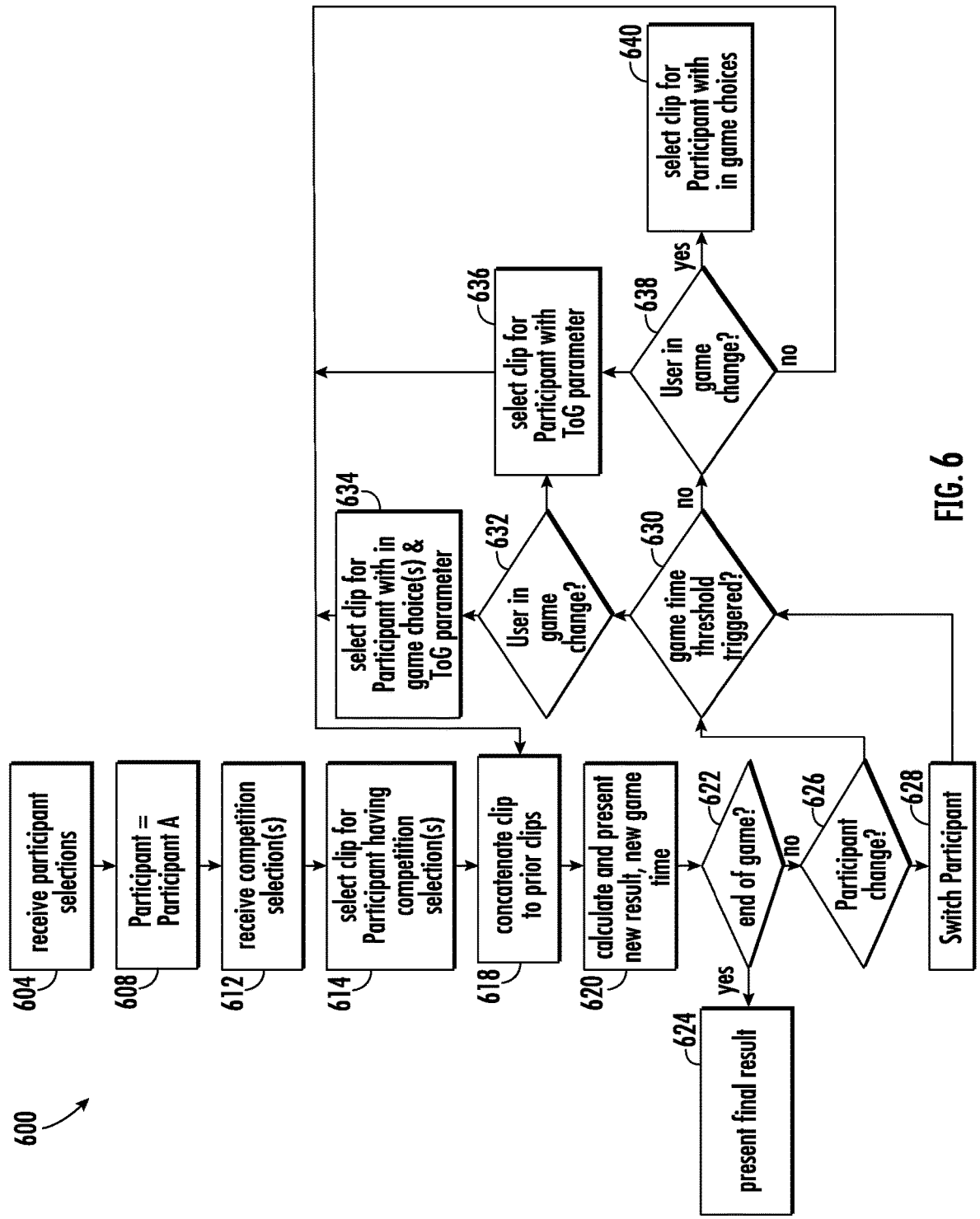
FIG. 6 is a flow diagram of an example method performing an example composite video competition.

FIG. 5 is a block diagram schematically altering portions of an example computing system 520 for generating an example composite video competition 530 from a library or pool 540 of parameterized video clips 546. FIG. 6 is a flow diagram of an example method 600 that may be carried out by computing system 522 generate and present the composite video competition 530. FIGS. 5 and 6 illustrate an example of how the composite video of a competition may be generated by concatenating video clips taken from different historical videos and how an intermediate result and final result may be generated and presented based upon a combination of the individual partial results of the individual video clips. FIGS. 5 and 6 further illustrate how ad videos, timeout videos, and public service announcement videos may be inserted amongst the concatenated video clips to transfer information or monetize the newly generated composite video competition. FIGS. 5 and 6 further illustrate an example of how different video clips may be parameterized with different parameters and how the different parameters may be used as criteria for selecting different clips for insertion into the composite video competition being generated. FIGS. 5 and 6 further illustrate how a size of the pool of clips from which a particular video clip is drawn for concatenation in the composite video competition may be narrowed or restricted in the middle of the composite video competition based upon the current time of the composite video competition and/or based upon input from the person viewing the composite video competition.

Pool 540 comprises a multitude of video clips 546-1-1, 546-1-2, 546-1-3 . . . 546-1-$n$ for Participant P1, video clips 546-2-1, 546-2-2, 546-2-3 . . . 546-2-$n$ for Participant P2 and . . . video clips 546-N-1, 546-N-2, 546-N-3 . . . 546-N-n for Participant PN (collectively referred to as clips 546). Similar to clips 146 described above, clips 546 are derived from videos between various teams or individuals. Such clips may be provided to computing system 120 such as where pool 540 is contained in a database stored in memory 524 of computing system 520 or stored in a remote database accessible by competing system 520 in a wired or wireless fashion. In some implementations, computing system 520 slices or segments the videos of prior historical competitions into the various clips 546.

Each of video clips 546 is parameterized to include an array of various characteristics or parameters associated with the particular video clip. Such parameterization may be carried out by computer system 520 or may be carried out by other systems or methods. In the example illustrated, each of clips 546 comprises the following parameters: (1) Participant P; (2) era E; (3) personnel Pe1 and personnel Pe2; (4) venue V; (5) time of game ToG; (6) weather W; (7) daytime/nighttime D/N; (8) circumstance Ci; (9) competitor Co; and (10) action type AT.

The parameter P indicates the participant depicted in the video clip. The parameter E indicates a period of time of the historical composition from which the clip was taken. For example, the parameter E may indicate that the clip was taken from a competition that occurred during a particular year or a particular decade. The parameters Pe1 and Pe2 indicate particular personnel from the players depicted in the video clip. For example, such a parameter may indicate that the clip depicts a particular quarterback, a particular running back, a particular batter, a particular basketball player, a particular soccer player, a particular picture, or the like.

The parameter V indicates the venue of the historical competition from which the cup was derived. For example, the parameter V may indicate that a game with a home game for P1 or a home game for P2. The parameter ToG indicates the time during the historical competition from which the clip was taken. For example, the parameter ToG may indicate that the clip occurred during the final two minutes of a game, during the first half of a game, following a timeout or the like. The parameter W indicates the current weather conditions depicted in the clip during the historical competition from which the clip is taken. The parameter D/N indicates whether the clip depicts a daytime or a nighttime environment.

The parameter Ci indicates the circumstances surrounding the particular video clip and the historic competition from which the clip was taken. For example, the parameter Ci may indicate that the clip was taken during the regular season or was taken during a tournament, a playoff, or a championship. The parameter Co indicates a characteristic of the competitor depicted in the video clip. For example, the parameter Co may indicate the name of the team or individual competing against the Participant in the video. The parameter Co may indicate the level of skill or ranking of the competitor depicted in the clip and/or the league, division, or conference to which the competitor is associated and the like.

The parameter AT indicates the type of action depicted in the video clip. For example, for a football video clip, the parameter AT may indicate whether the clip depicts a run, a pass, a field goal attempt, a kickoff, or the like. The parameter AT may even be more refined identifying particular running plays or particular passing plays. For a basketball game, the parameter AT may indicate whether the clip depicts a driving layup attempt, a three-point shot attempt or a two-point shot attempt. For a baseball game, the parameter AT may indicate whether the clip depicts a bunt, a steal or the like. In some implementations, the parameter AT may indicate a defense or an offensive formation for the Participant or for the competitor competing against the Participant. For example, with respect to a basketball game, the parameter AT may indicate that the video clip depicts the Participant or the competitor implementing a zone defense or a man-to-man defense. With respect to a football game, the parameter AT may indicate that the video clip depicts the Participant or the competitor implementing a particular defensive set up our particular type of blitz. With respect to a baseball game, the parameter AT may indicate that the video clip depicts the Participant or the competitor implementing a particular infield and outfield set up In some implementations, video clips 546 may include a greater or fewer number of such parameters and may include other parameters. As will be described hereafter, the different parameters of the different video clips may be used to identify those clips that are eligible for being selected by computing system 120 during the generation of the composite video competition.

As further shown by FIG. 5, each video clip 546 also has a parameter indicating the partial result PR of the particular clip for the Participant. As described above, the partial result may have many different forms depending upon the nature of the competition and the granularity of the individual clip. For example, the partial result PR may be in the form of a number of points or a lack of points or scoring. The partial result PR may be a yardage gain and/are field position in a football game. The partial result PR may be a ball, strike, or type of hit such as in a baseball game. The partial result PR may be a base advancement in a baseball game. In some implementations, a clip may have multiple PR parameters indicating various partial results attained by the Participant during the portion of the competition depicted by the video clip.

Computing system 520 comprises memory 524 and processing unit 528. Computing system 520 additionally comprises display 573 and input 575. Memory 524 comprises a non-transitory computer-readable medium, such as a non-volatile memory in the form of a solid-state drive (flash memory) or a disk drive. Memory 524 may be used to store both instructions and any generated composite video competitions. As discussed above, some implementations, memory 524 may additionally store the pool 540 of available video clips. Processing unit 528 carries out the instructions contained in memory 524.

Display 573 comprises a monitor, screen, television, or other device for presenting the concatenated series of video clips and video inserts which form the composite video competition 530. Input 575 comprises a touchscreen, mouse, stylus, microphone with speech recognition, keyboard, keypad, or other device for receiving information and commands/selections from a person, such as a person viewing the composite video competition 530 or requesting the generation of the composite video competition 530.

FIG. 6 illustrates a flow diagram of an example method 600 which may be embodied by instructions (in the form of software code or integrated circuitry) contained in memory 524 for directing processor 528 to generate composite video competition 530. As indicated by block 604, computing system 520 receives the participant selections. The person or persons requesting the generation of the composite video competition 530 may use input 575 to identify the two teams, two individuals or two entities that are to compete in the composite video competition 530. The received input of the participant selections restricts the universe of video clips for forming the composite video competition 530, those video clips having a value for the parameter P matching either of the two identified participants.

As indicated by block 608, computing system 520 identifies one of the selected participants as the first participant for which the first video clips are to be selected.

As indicated by block 612, computing system 520 prompts the person or persons to enter any selected competition parameters. Such prompts may be made by using display 573 and may receive using input 575. Such competition parameter selections identify the general conditions of the competition and restrict the available clips to those clips having parameters that match the selections. In the example illustrated, the person requesting the generation of the composite video competition 530 may indicate a preference for the personnel of the Participant (Pe1 or Pe2), the venue V of the clip, the time of game ToG of the clip, the weather depicted in the clip, the day/night condition of the clip, the circumstance Ci of the clip, and/or the competitor Co of the clip. In some implementations, not all of the noted parameters are made available for selection. In some implementations, the person may provide an input indicating that the parameters are to be default parameters (predefined) or that such parameters may be randomly chosen by computing system 520.

As indicated by block 614, based upon the competition parameter selections received in block 612, instructions stored in memory 524 direct processing unit 528 to randomly select a video clip from the pool 540 for the current Participant having the competition parameter selections. In some implementations, a person may trigger the random selection by spinning a wheel, rolling a dice or other input. As indicated by block 618, upon selection of the video clip 546 satisfying the competition parameter selections for the current Participant, the video clip is concatenated to any prior clips or to any introduction videos such as an ad video or information video.

As indicated by block 620, processing unit 528, following instructions contained in memory 524, determines and presents a new intermediate result in a new competition or game time. The new intermediate result may be determined by adding the new additional partial result for the current participant contained in the last concatenated clip to the existing ongoing status for the Participant. For example, the new intermediate result may be determined by incrementing the total score for the Participant by the additional scoring associated with the last concatenated clip. The new intermediate result may be determined by incrementing the most recent field position by any yardage additions are subtractions associated with the last concatenated clip. The new intermediate result may be determined by incrementing the base positions based upon the result of a hit (a single, double, triple or homerun) associated with the last concatenated video clip.

The new game time may be determined by incrementing the prior game time for the composite video competition by an amount of time corresponding to the lapse of time depicted in the last concatenated video clip. The game time identifies how much time remains in the composite video competition. As will be described thereafter, in some implementations, the current game time at which a new clip is to be added may control what video clips are available for selection in block 614. As indicated by block 622, following update of the game time, computing system 520 determines whether the end of the composite video competition or game has been reached. As indicated by block 624, should the end of the game have been reached, computing system 524 proceeds with displaying or presenting the final result for each of the two participants chosen in block 604.

As indicated by block 626, in response to the end of game not having been reached, computing system 520 proceeds with determining whether a participant change has occurred. A participant change may occur at the end of an offensive possession for the current Participant. For example, in the game of basketball, a participant change may occur after the current participant commits a turnover in the last concatenated clip or scores in the last concatenated clip. In the game of football, a participant change may occur after the current participant fails to achieve a first down, after the current participant commits a turnover or after the current participant scores in the last concatenated clip. In the game of baseball, a participant change may occur after the participant has a third out during its at-bat in the last concatenated clip. Each of the above participant change triggers are indicated by the partial result PR parameter associated with the particular video clip or are determined in block 620. As indicated by block 628, upon determining that the participant is to be changed, computing device 520 switches from the current participant to the other Participant, switching from Participant A to B or vice versa.

As indicated by block 630, before selecting the next video clip for concatenation, computing device 520 may determine the current game time and compare the current game time to any game time thresholds predefined as part of the composite video competition 530. In circumstances where the current game time satisfies a predefined game time threshold, computing system 520 restricts the number of video clips in pool 540 available for selection for the next video clip. Computing system 520 draws the next video clip only from those available video clips having a time of game parameter that matches the game time threshold.

For example, in some implementations, computing system 520 may limit what particular video clips may be selected for the final two minutes of a composite video competition 530 to those video clips in pool 540 that also have a ToG parameter indicating that the particular video clip was also for a portion of the historical competition that occurred during the final two minutes of the historical competition. In some implementations, such video clips may be of shorter durations as compared to other video clips not having such time of game parameters.

In some implementations, the composite videogame 530 may be generated with computing system 520 applying multiple different game time thresholds. For example, computing system 520 may draw from a first subset of available video clips during the final two minutes of a game and may draw video clips from a second different subset of available video clips during the final 10 seconds of a game. In response to a 48-minute game time threshold being satisfied (such as after a two-minute warning in a professional football game), wherein the game time is equal to or greater than 58 minutes, computing system 520 may begin drawing from only those video clips having a 58 minute/2 minutes remaining time of game parameter. In response to a 59-minute 30 seconds threshold being satisfied by the current game time, computing system 520 may begin drawing from only those video clips having a 59 and 30 seconds (final 30 seconds of a 60-minute game) time of game parameter. Examples of such game time thresholds and corresponding time of game parameters include, but are not limited to, the final two minutes of a first half, the final two minutes of a second half, the final 30 seconds of the game, the final 10 seconds of a game, an over time (especially in college football), the final inning of a baseball game, an extra inning in a baseball game and the like.

As indicated by block 632, in circumstances where the game time threshold has been satisfied or triggered, computing device 520 additionally determines whether any user in game changes have been requested by the person viewing composite video competition 530 via input 575. For example, during the running of a video clip, following a video clip or during a timeout request by a person viewing competition 530 and made using input 575, a person may enter a command or selection requesting a change in personnel for the Participant. In the case of a football game, the person may request a change in quarterback. Following such a change, until further changes are requested, all subsequent video clips available for selection will be restricted to those video clips having a personnel parameter Pe matching the personnel selected by the person. In the case of a baseball game, the person may request a particular batter. When such a personnel selection is made, the video clips available for selection for the next video clip to be concatenated will be restricted to those video clips having a personnel parameter Pe matching the batter selected by the person watching competition 530.

During the running of a video clip, following a video clip or during a timeout request by a person viewing competition 530 and made using input 575, a person may enter a command or a selection of a particular action type for the next video clip for concatenation. For example, in circumstances where composite video competition is a football game, the person may request that the next video clip be of a certain type of place such as a run play, a pass play, a punt or a field goal attempt. Once a particular type of action, such as to the type of play is selected, the video clips from which the next video clip will be selected will be limited to those video clips having an action type parameter AT matching the selected action type received from the person viewing composite video competition 530. As a result, the person may participate in the generation of the composite video competition during the composite video competition itself by having input or control over what particular type of video clips are concatenated to form the competition 530. In one sense, the composite video competition may serve as a game in which the person viewing the composite video competition 530 may develop and carry out competition strategies.

As indicated by block 634, in response to both the game time threshold being triggered in block 630 and the user in game change being requested in block 632, computing system 520 proceeds by randomly selecting the next clip for concatenation from the restricted set of video clips having parameters matching the time of game parameter corresponding to the game time threshold and the selected user in game parameter change. Once the next clip for inclusion has been selected in block 634, computing system 520 proceeds with concatenating the newly selected clip is block 618, and the process continues.

As indicated by block 636, if the user (person viewing the composite video competition) has not made any in game changes, computing system 520 randomly selects a video clip having a time of game parameter that corresponds to the game time threshold that was satisfied by the current game time in block 636.

As indicated by block 638, in circumstances where a game time threshold has not been triggered or satisfied, computing system 520 determines whether an in-game change has been received via input 575. Such a determination as discussed above with respect to block 632. As indicated by block 640, if a user in game change has been input, computing system 520 proceeds by selecting the next video clip for concatenation from only those video clips having a parameter (PE or AT) that matches the user in game change, such as the specific selection of personnel or an action type by the user. Once selected, the video clip concatenated as indicated by block 618 and the process continues. In circumstances where a game time threshold has not been triggered in block 630 and where the person viewing composite video competition 530 has not made any in game changes in block 638, computing system 520 proceeds by selecting the next clip for the Participant in block 614 based upon the initially determined competition selections.

In some implementations, computing system 520 may be employed as a teaching or coaching tool for analyzing a prior performance by a Participant or for analyzing tendencies of Participant to be faced in a forthcoming competition. For example, a user may enter a particular AT parameter for viewing only those video clips that depict the particular action type. In some circumstances, the user may additionally or alternatively enter a particular circumstance parameter CI or a particular ToG parameter to further identify how the Participant performed in a particular circumstance or for a particular time of game. For example, by inputting an appropriate AT parameter, a coach or other person may filter out only those video clips that depict how a Participant performed when employing a zone defense or a man-to-man defense in basketball. The coach may use such information to identify how to best attack a zone defense or a man-to-man defense employed by the Participant. Alternatively, the coach could use such information to identify how a particular Participant went against or attacked a zone defense or man-to-man defense. By inputting inappropriate Ci parameter and/or ToG parameter, a coach or other person may filter out only those video clips that depict how a Participant performed or reacted during a selected particular portion of a game, such as the final two minutes of the half or of the game, allowing the coach to identify tendencies of the Participant to run a certain play or implement a certain type of defense.

By randomizing the concatenation of different video clips from prior live footage or historical competitions and by further possibly adding scoring using the partial results from each video clip, computing system 20 may add some entertainment value to the task of film watching by players. In some implementations, instead of inserting advertisements or commercials between the various video clips, instructional clips or coaching clips for the players, based upon the content of the video clips, may be inserted amongst the string of concatenated video clips. In some implementations, the scoring may be omitted.

FIG. 5 further illustrates the example composite video competition 530 generated by computing system 520 using method 600. Composite video competition 530 comprises a video production for presentation on display 573. As shown by FIG. 5, composite video competition 530 comprises various lengths of concatenated clips 546 video with each video clip taken from a video of a prior or historical competition. In some implementations, the video clip 546 may be drawn from videos of at least 10 different historical competitions for each of the Participants. As discussed above, each video clip may depict one of the Participants competing against a competitor who is not one of the Participants. In some instances, video clip may depict both Participants competing against one another in the historical competition.

In some implementations, computing system 520 may incorporate a weighting or bias which favors the selection of video clips that depict both Participants competing against one another in a historical competition. For example, when selecting a video clip for an offense of possession for Participant A, computing system 520 may determine if the competitor parameter of a video clip matches Participant B. If a match exists, computing system 520 may bias or weight the random selection of the next video clip towards those video clips having such matches. In some implementations, computing system 520 applies the weighting or bias of the selection of video clips for those video clips depicting direct competition between Participant a and Participant to selected or predefined portions of the videogame competition. Such a bias or weighting may be applied to the random selection of the next video clip upon satisfaction of a game time threshold. For example, during the file two minutes of a game, the system 520 may apply the bias and may be more likely to draw from the universe of available clips in pool 540 that depict direct competition between the two Participants. In some implementations, the bias may be 100% such that for selected portions of the game, computing system 520 randomly selects the next video clip for concatenation from only those video clips depicting direct competition between the two Participants.

At the end of the composite video competition game time, computing system 520 displays or presents the final result 558. The final result 558 may be a comparison of the final results for each of the Participants. Each Participant's final score is based upon a combination of the partial results PR of each video clip selected for the particular Participant and forming the competition 530. In some implementations, the final result may be in the form of a score for Participant A versus a score for Participant B.

Similar to composite video competition 330, composite video competition 530 may additionally include intermediate results in the form of running scores 559 and may include audible commentary 370, each of which may be overlaid upon the concatenated video clips being displayed on display 573. Similar to composite video competition 330, composite video competition 530 may further include various video segments inserted amongst the concatenated clips 546. Examples of such inserted video may include video commercials or ads 356, public service announcement videos 360 and timeout video segments 354.

Timeout video segments 354 may be automatically inserted by computing system 520 or may be inserted in response to a request for a timeout received via input 575 from a person viewing composite video competition 530. The timeout video segment may be a graphic indicating that a timeout is being taken. The timeout video segment may be an actual video clip of coaches/managers and players of the Participant meeting. For example, the timeout video may depict the coach and a quarterback huddling, a manager, catcher, and pitcher at a pitching mound or the like. During the timeout video segment 354, the person viewing the composite video competition 530 may input an in game change 570. As discussed above, such an in-game change is identified in blocks 632 and 638 of method 600 and may restrict the number of clips available for concatenation to those clips having particular parameters that satisfy the requested in game change.

It should be appreciated the computing system 520 and method 600 may be utilized to generate and possibly display a variety of different composite video competitions. Each of the above demonstrated features or options may be omitted from computing system 520 or may be provided as user selectable modes. For example, in some implementations, game time threshold may be omitted or may be the user selectable mode, wherein the user may select which game time thresholds, if any, are to be used. In some implementations, the ability of a user to change personnel or select particular action types may be omitted or may be user selectable modes. As discussed above, in some implementations, each video clip may have a greater or fewer number of such parameters or may have other parameters that may be employed in controlling or restricting the available video clips from which video clip is randomly selected by computing system 520.

Figure 7:
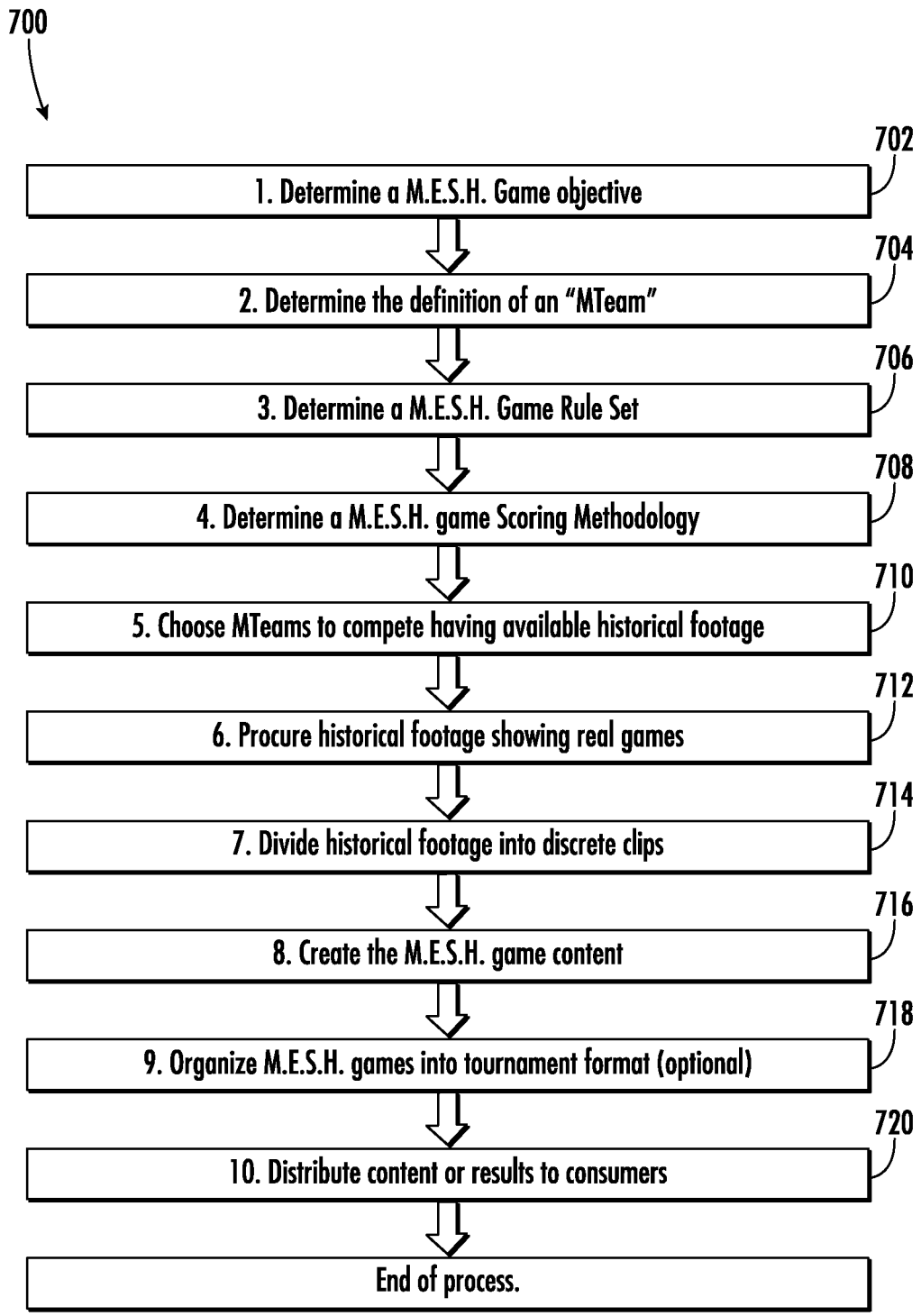
FIG. 7 is a flow diagram illustrating an example method performing an example M.E.S.H. game

FIG. 7 illustrates an example M.E.S.H. game method 700. It is nominally a 10-step process with step 9, "Organize M.E.S.H. games in Optional Tournament", being optional. Traversing the steps in FIG. 7, the numbered steps are discussed accompanied by some possible options for each numbered step. Steps one through ten are described below in detail:

As shown by block 702, a M.E.S.H. game objective is determined. As with most competitive games, a game objective is generally predetermined before the initiation of the game. In the example M.E.S.H. game process, determining a game objective is step 1. (Note that a discussion of specifically what constitutes a "team" and a "game" in the M.E.S.H. game process, will occur in later steps.) Some possible game objective options include but are not limited to: (1) be the team that outscores an opposing team in a head-to-head M.E.S.H. game competition; (2) be the top scoring team in a group of competing teams. This objective allows multiple teams to vie for one open position in a tournament.

As indicated by block 704, the definition of a "Team", more specifically an MTeam, is determined. In the example M.E.S.H. process, any reasonable assemblage of entities can be combined to form a new M.E.S.H. game "team", also referred to as an MTeam, to attain the Game Objective in block 702. In this context, an MTeam could conceivably represent many kinds of assemblages, including even an individual person. Some options for what would constitute a MTeam in a M.E.S.H. game include, but are not limited to, (1) a college such as Duke University; (2) a professional sports team such as the Denver Broncos; (3) an amateur league team such as a local soccer team; (4) an individual such as Pro golfer Phil Mickelson, or professional Poker Player such as Phil Ivey or Pro WNBA player Candace Parker; (5) an arbitrary grouping of real players, for example, the 2005 Major League Baseball All-Star team; (6) an arbitrary grouping of real teams, for example all teams in the NFL NFC North Division; and (7) an arbitrary grouping of real groups, for example all the Major League Baseball All Star Teams from the American League since 2003.

Activities that are not considered "sports" can still be utilized in the example M.E.S.H. game process. Some of those activities include, but are not limited to gambling and betting; Electronics Sports, popularly known as E-Sports; chess; card games; vehicle racing; martial arts; animal racing such as horse racing or dog racing; TV Game shows; weather forecasting; and political debates As indicated by block 706, a M.E.S.H. Game Rule Set is determined. In the example M.E.S.H. game process, new content called a M.E.S.H. game is created (such as with computing system 520 described above), in part, by slicing historical footage depicting MTeams (or their members) into discrete video clips and subsequently reassembling those clips in a new order. A rule set is determined that establishes what constitutes an allowable video "slice" length. Furthermore, the reassembly process, specifically what clip to choose next for a given MTeam is defined. (M.E.S.H. game scoring is handled in step 4, block 708.)

Video clip lengths can be created based on, but not limited to a fixed time, a turn, a combination of a fixed time and turn, a random length, a slice as you go, a slice until or any combinations thereof. A fixed time-based clip length may be based upon sports time (the time elapsed during the historical gamer competition) or real time. Examples of a fixed time-based clip length include: (1) clips are 5 score clock minutes long in a basketball game; (2) clips show 1 quarter in a basketball or football game; and (3) clips show 10 minutes of real time in a road bike race such as the Tour de France.

Examples of Turn based video clip lengths include: (1) clips show 1 individual play in a football game; (2) clips show 1 possession in a football game; (3) clips show 1 hole each in a golf match. One example of a combination of time-based and turn based video clip lengths would be a clip ending at the conclusion of the next offensive possession after the 5-minute score clock mark in a basketball game. This would result in all clips being greater than or equal to 5 game minutes long. An example of a random length video clip length may be a random generation of a number by a computer that randomly chooses the next clip length.

Use of a slice as you go basis for a video clip length may stem from a need to fit a live broadcast into a specific time slot. In such implementations, video clip lengths could be lengthened or shortened dynamically depending on a remaining broadcast time window. The length of the video clip may be based upon some action in a clip occurring. For example, clips may be sliced to show only a given player, say Michael Jordan of the Chicago Bulls. Clips may be made that begin when he enters a real game and ends when he exits the game. In yet other implementations, a computer system may slice actual historical game footage of historical competitions based upon any combination of the above criteria. For example, historical footage may be sliced into video clips such that a clip will end at the conclusion of a random number of possessions after the 5-clock minute mark.

In addition to possibly slicing historical video footage of historical competitions into video clips, a computer system, such as computer system 520 described above, determines how to reassemble, or concatenate the different video clips to form a composite video competition such as an Mgame. Video clip reassembly (MESH) order, specifically which clip should be selected next for inclusion, can be based on, but not limited to, various rules or factors. In one implementation, what particular video clip is concatenated as part of the composite video competition is random or quasi-random. For example, the next video clip to be concatenated may be chosen by a segmented spinning wheel with a pointer as is popular in television game shows or a user digital (on the display screen) a roll of dice where the result of dice thrown equates to a particular clip.

In some implementations, the next video clip selected for assembly of part of the composite video competition (Mgame) may be based upon human intervention. For example, the next clip maybe chosen by a person on a "call in line" via telephone or by voting with numbers or dollars. With such a method, depending upon implementation, the computing system may remove some of the inherent unpredictability of the outcome discussed in other parts of this document.

In some implementations, the next video clip to be added to the composite video competition may be based upon a time mark correspondence (similar to use of the game time threshold described above). With a time mark correspondence, rules may be made concerning time mark correspondence between the originating historical game and the Mgame. In other words, a clip depicting the last minute of regulation in an Mgame must have come from the last minute of regulation in the original, historical game. Examples of use of the time mark correspondence reflect which video clip to be next added include: all clips must correspond to their starting time marks; all clips in the last 5 minutes of regulation must correspond to their historical starting time marks; or clips can come from any period in the historical game regardless of use in the M.E.S.H. game.

As indicated block 708, a M.E.S.H. Game scoring Methodology is determined. A rule set may be predetermined to calculate a score for all competing MTeams playing in a given M.E.S.H. game. Some possible options for Game Scoring Methodologies are described below. For each the following example options, assume that A and X are MTeams competing in a M.E.S.H. game. Also assume that MTeam A plays opponents B and C in A's video clips. Likewise, MTeam X plays opponents Y and Z in X's video clips. One example scoring methodology may be based upon total scoring. With Total Scoring, all points scored in MTeams A's clips by MTeam A are awarded to MTeam A. Similarly, all points scored in MTeam X's clips by MTeam X are awarded to MTeam X. Points scored by opponents B, C, Y and Z are disregarded.

A second example scoring methodology is based upon net scoring. With Net Scoring, MTeam A may be awarded all the points it scores in its clips minus the total points scored by opponents B and C, thereby producing a Net score for A. Similarly, MTeam X will be awarded all the points it scored in its clips minus the total points scored by opponents Y and Z, thereby producing a Net score for X. Then MTeam A and MTeam X compare their NET scores to determine a winner. Net scoring results in lower final M.E.S.H. game scores compared to Total Scoring due to subtraction of opponent's points. Net scoring accounts for both the offensive and defensive success of MTeams A and X. Net scoring adds an element of fan interest because the scoring of all entities viewed in the clips (MTeams and opponents) factors into the final score.

A third example scoring methodology is based upon crossover scoring. With Crossover scoring, MTeam A will be awarded all the points it scores in its clips. However, the points scored by its opponents, B and C, are awarded (crossover) to MTeam X. Similarly, MTeam X will be awarded all the points it scores in its clips. However, the points scored by its opponents, Y and Z, are awarded (crossover) to MTeam A. Crossover scoring may result in higher scoring compared to both Total Scoring and Net scoring. Crossover scoring accounts for both the offensive and defensive success of MTeams A and X. Crossover scoring may add an element of fan interest because the scoring of all entities viewed in the clips (MTeams and opponents) factors into the final score. Furthermore, opponent's offensive points are reflected in the final score. Moreover, crossover scoring may result in the most realistic scores as compared to real life games.

Various modifications may be applied to the above game scoring methodologies employed by a computing system generating the composite video competition/Mgame. Such modifications include outlier knockout scoring, live score insertion, point weighting and MTeam score offsets. With outlier knockout scoring, the high, low, or both high and low scores for MTeam A's clips are removed. The same is done for MTeam X. Outlier knockout scoring removes outliers in scoring data.

With Live Score Insertion, a method is used where a person or persons performs some act, likely in real time, and usually a skill common to the game, to score, or possibly remove points from one of the MTeams. The person or person's scoring does not occur in a video clip but is filmed separately. By way of example, assume that A and X are MTeams representing basketball teams from two different colleges. Between clips, a former player for A and former player for X, could have a live free throw shooting contest. The player with the most made free throws out of 10 attempts, will add say 2 extra points to her team's clip total. By way of another example, assume A and X are MTeams representing football teams from two different colleges. During the clips, if field goal attempts appear in the clips, kickers who represent A and X could attempt real life kicks from the range shown in the clip to score for their respective teams. Then the clips would continue with the updated score for A and X.

With point weighting, some points become worth more than others. For example, assume that A and X are MTeams representing college basketball teams who have played in various years of the 64 team Women's NCAA National Basket Tournament. Therefore, their clips could conceivably show games from the $1^{st}$ through $6^{th}$ rounds since there are 6 rounds in a 64-team tournament. Points could be weighted such that points scored in a $6^{th}$ round game, which is a championship game, are worth more than points scored in a first round game.

With MTeam score Offsets, one MTeam starts a M.E.S.H. game with a nonzero score. Therefore, one MTeam has a "head start" or handicap. A handicap may also be applied at halftime to keep starting scores truer to life. For example, assume that A and X are MTeams representing college football teams who have finished in the top ten since 1990. If running a M.E.S.H. game with these MTeams, one could offset the MTeam that had more top 10 finishes than the other by say 7 points. Therefore the M.E.S.H. game score would start off 7-0 before any clips were ever played to award the MTeam with more top ten finishes.

As shown by block 710, method 700 involves the selection of MTeams to Compete having Available Historical Footage. Options for choosing MTeams to compete having available historical footage, from which clips will be extracted, are many. Usually, but not absolutely, two MTeams will compete head-to-head in a M.E.S.H. game. A non-exhaustive list Options for choosing MTeams to compete having available historical footage:
  i. By season—Example: Two MTeams with real games played during the 2018 NCAA Division 1 Women's Basketball season
  ii. By tournament—Example: Two MTeams with real games in the 2018 National Basketball Association (NBA) playoffs
  iii. By era—Example: Two MTeams with real games in the post 3-point NCAA era from 1986 to present
  iv. By player—Example: Two MTeams with real Master's Tournament competitions featuring Tiger Woods and Phil Mickelson
  v. By location—Example: MTeams who played football games at Denver's Mile High Stadium
  vi. By team—Example: MTeams who played real games featuring the NFL New York Giants and Dallas Cowboys
  vii. By Score—Example: MTeams who scored 125 or more points in NBA games
  viii. By league grouping—Example: MTeams who play games as part of the NFL NFC North division
  ix. By statistic or performance—Example: MTeams who are in the top eight highest scoring NBA teams of the past 25 years
  x. By subjective committee—Example: A selection committee could pick what they consider as the most storied 64 MTeams, each representing a college, to play in a single elimination tournament.

As indicated by block 712, the historical footage showing real games (historical competitions) is procured. Options for procuring footage will be dependent upon the domain of games sought in the prior step as well as footage availability, licensing, available storage space and footage quality. As indicated by block 714, Once the historical video competition or historical footage has been procured, the historical footage (video historical competitions) is divided into discrete video clips as described above. Options for physically dividing the footage will be dependent upon the game footage attained and the editorial processes implemented as well as the equipment used. Footage division may be done to satisfy the Game Rule Set and Game Scoring Methodology chosen in steps 3 and 4, respectively. Clips may also need to accommodate their anticipated distribution channels in regard to station breaks, commercials, transitions, audio overlays, and video overlays such as modified scoreboards, tickers, and banners. In some implementations, this step may be a video editing step to be performed by individuals skilled in the art of video editing.

As indicated by block 716, the computing system, such as computing system 520 described above, generates new M.E.S.H. game content by reassembling selected video clips into either recorded media, a live broadcast, so some combination. During such assembly or concatenation, the video clips may be reassembled (MESHed) together per the options chosen in the Game Rule Set in step 3, block 706. During such assembly, other enhancements can be inserted into the M.E.S.H. game content. Examples of such enhancements or inserts include, but are not limited to, live score insertion as noted in step 4, block 708, addition of breaks for commercials, public service announcements, updates concerning other activities, or replays, audio overlays, for instance if a producer chooses to overwrite the original, historical audio, or add crowd noise, or reduce background noise, video overlays, for instance for an updated scoreboard that reflects the M.E.S.H. game score rather than the archival score from the original, historical footage or other overlays such as scrolling tickers or banners, or replays, and historical anecdotes and factoids.

As indicated by block 718, the computing system may, as an option in some implementations, organize M.E.S.H. Games into Tournament Format. The M.E.S.H. game process is ideally suited for placing M.E.S.H. games into tournament formats. Using this approach, one could easily implement a single elimination tournament where 64 MTeams compete, representing perhaps 64 colleges that have played in the previous 25 years in the NCAA Men's Basketball Championship tournament. The MTeams could be chosen, for example, by choosing the 64 colleges with the most tournament wins in that span with some accommodation for breaking ties and seeding.

The options for creating tournaments using the M.E.S.H. game process are many. Some possible options are shown but not limited to those below:
  a. Options
    i. Choosing MTeams for tournaments
      1. Choice of MTeams for a tournament include the options shown in steps 5. Of course, many other options exist for choosing the domain of MTeams to play in a M.E.S.H. game-based tournament.
    ii. Standard tournament type options:
      1. Single elimination tournament
      2. Double elimination tournament
      3. Round Robin tournament
    iii. Non-Standard tournament type options:
      1. Single elimination tournament with play-in games as is done in the NCAA Men's basketball championship with their 64-team bracket with 4 team play-in
      2. three or more "teams" vying for the same tournament spot
    iv. Seeding options
      MTeams must be arranged in some fashion in a Tournament to decide who plays whom. This is popularly known as "seeding". Many options exist for seeding M.E.S.H. game-based tournaments including but not limited to:
      1. Seeding by Objective Numerical Score
        a. Prior wins
        b. Weighted prior wins
        c. Fan poll results
      2. Seeding by Subjective methods
        a. Selection committee chooses the seeding
      3. Random seeding As indicated by block 720, the computing system may distribute content or results to consumers. The generated composite video competition/Mgame may be distributed by a live television broadcast or a live stream, by on-demand or tape delay distribution or by multicast and merging. With a live television broadcast or livestream, after steps 1 through 7 are complete, a live television broadcast or online video stream can be produced and distributed starting at step 8 with M.E.S.H. game content being created and broadcast in real time. Alternatively, the composite video competition or Mgame can be distributed by on demand or tape delay distribution in a non-live format for consumption at some point after creation With a multicast and merge distribution, the M.E.S.H. games from two different competing MTeams may be multicast and merged. For example, suppose MTeam A plays opponents B and C in A's video clips and MTeam X plays opponents Y and Z in X's clips. Multicasting may work as follows: MTeam A and its opponents are broadcast on for example, Channel 1, for perhaps the first 90% of its video clips. MTeam X and its opponents are broadcast on channel 2 for the first 90% of its video clips. Thus, a single M.E.S.H. game is split into two (or more) simultaneous broadcasts, each featuring only 1 MTeam in all clips. Merging may work as follows: At the 90% mark, both broadcasts are synchronized and broadcast together by alternating between MTeam A clips and MTeam X clips. The merged broadcast would likely be carried on both channel 1 and 2. Multicasting and Merging presents a vehicle for targeting content specifically to two different fan bases, each on their own channel, with content specific to each fan base until the merge point. It also gives fans an extra element of excitement and heightened tension by watching the opposing MTeam's progress after the merge.

Each of the features described above with respect to method 700 may be applied to method 600 described above. FIGS. 8A, 8B, 8C show an example of the M.E.S.H. game process or method 800, which is an example of the 10-step process generically described method 700. The example method 800 involves head-to-head competition as its M.E.S.H. game objective in step 1 (block 802).

In this example, Step 2 (block 804) defines an MTeam as the collection of basketball teams from a given college that have played in the NCAA March Madness tournament since 1987. Therefore, an MTeam is an assemblage of real-life teams from a single college in this embodiment. In step 3 (block 806), the embodiment defines a Game Rule Set with a 40-clock minute M.E.S.H. game, 20 minutes for each MTeam, with random next-clip selection via a spinning wheel. Clips must be taken from the corresponding time marks in the historical game meaning, for example, that clips depicting the last minute of regulation in the M.E.S.H. game must be from the last minute of regulation from the historical game as well to more closely emulate the flow of a real-life game, although this is just one of many possibilities. Also, the clip reassembly rules dictates that clips be 5-5-5-5 (halftime) 5-5-2-2-2-2-1-1 game clock minutes in length, alternating between MTeams, to ensure that the outcome cannot be mathematically known until at the earliest, the 39-minute mark. However, it is highly unlikely that most viewers would be familiar enough with a particular 1-minute clip to even know the outcome in the last 60 seconds of play. Clips are also allowed to run slightly over their cutoff times because they will physically stop at the end of the possession underway when the cutoff time is hit. This concept is termed "Possession Extension" and leads to more graceful clip endings.

In step 4 (block 808), the example employs a Scoring Methodology using Crossover scoring, which awards MTeam A's offensive points scored to itself and similarly for MTeam B, but which awards MTeam A's opponents' offensive points to MTeam B and vice versa. Therefore, to calculate the final outcome of the M.E.S.H. game at the 39-minute mark (1 minute for the M.E.S.H. game actually would end), one would need to know the points scored by BOTH the MTeam and its opponent in the clip at its onset which is exceedingly unlikely.

In step 5 (block 810), MTeams are chosen to compete that have available footage consistent with the MTeam definition in step 2. From the FIG., Duke University, and the University of Kentucky, are the two MTeam's chosen. The footage required is the set of all NCAA National Championship Tournament games containing either school from the 1987 tournament onward.

Step 6 (block 812) undertakes the physical procurement of the historical footage from step 5, namely all of the footage featuring either MTeam. Step 7 (block 814) undertakes the video editing step to divide the footage in step 6 per the clip division rule in step 3 which prescribes the various 5-minute, 2 minute and 1 minute clip lengths.

Step 8 (block 816) details the actual reassembly of clips to build new M.E.S.H. game content. Reassembly order is followed per the Game Rule Set in step 3 and scoring is applied per Game Scoring Methodology in step 4. Starting with step 8, the process is performed on live television, emulating a current NCAA National Championship live broadcast format.

Step 9 (block 818) extends the example using a 64-team tournament by using MTeams that are the collection all basketball teams from the top 64 colleges as ranked by most wins in the NCAA National Championship Tournament since 1987. Therefore, there would be 64 MTeams, each defined as the collection of all real-life teams from a given college that have appeared in that tournament since 1987. Although there are 64 MTeams, they would encapsulate perhaps 320 real life teams from different seasons, assuming those 64 colleges had qualified for the tournament 5 times each.

The new M.E.S.H. game content is assembled in a live broadcast in steps 8, 9 and 10 (block 820). The games are also organized into a 64-team single elimination tournament that is carried live on television. Appropriate commercial breaks are inserted during the broadcasts, as well as specialized video overlays for tracking the M.E.S.H. game score. Random next clip selection is performed by the on-air TV announcers so that fans can be assured the outcome is not predetermined.

FIGS. 9 through 23 depict various features from a M.E.S.H. game. Note that the MTeams are the Iowa State University (ISU) Cyclones vs University of Northern Iowa (UNI) Panthers. They are depicted versus various opponents in these clips but at no time do ISU and UNI appear in the same clip. Note as well that the M.E.S.H. game depicted in these FIGS. use highly shortened clips and is for conceptual purposes only. Therefore, the video timing in the lower left hand of each clip should be disregarded as these FIGS. do not depict a standard 40-minute basketball M.E.S.H. game.

Figure 9:
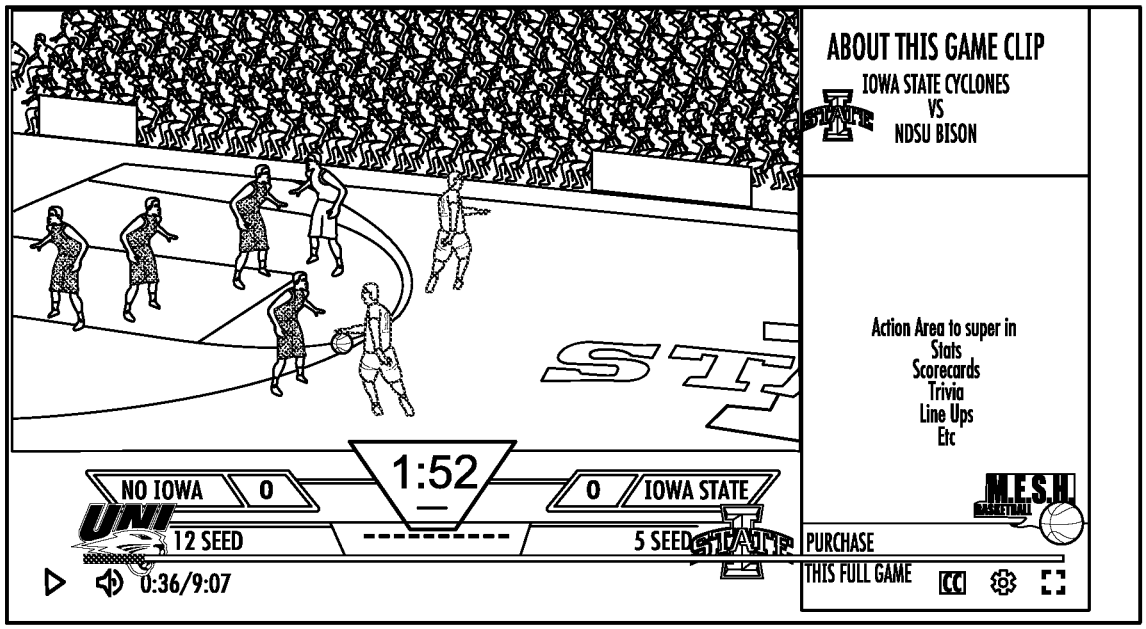
FIGS. 9 through 16 depict various features from an example M.E.S.H. game. Note that the MTeams are the Iowa State University (ISU) Cyclones vs University of Northern Iowa (UNI) Panthers. They are depicted vs various opponents in these clips. Note as well that the M.E.S.H. game depicted uses highly shortened clips and is for conceptual purposes only. Therefore, the video timing in the lower left hand of each clip should be disregarded as these FIGS. do not depict a standard 40-minute M.E.S.H. game.

FIG. 9 illustrates the beginning of the opening clip in an M.E.S.H. game matching ISU VS UNI with MTeam ISU in possession of the clip vs North Dakota State University (NDSU) Bison from 2017. Note that UNI is not featured in this clip although ISU and UNI are the MTeams. Also note that, in this embodiment, NDSU's score is not shown explicitly on the screen (although their points will be awarded to MTeam UNI later due to the use of optional crossover scoring). Note as well that players are moving in a highly multidirectional manner as would be expected in a real-life basketball game.

Figure 10:
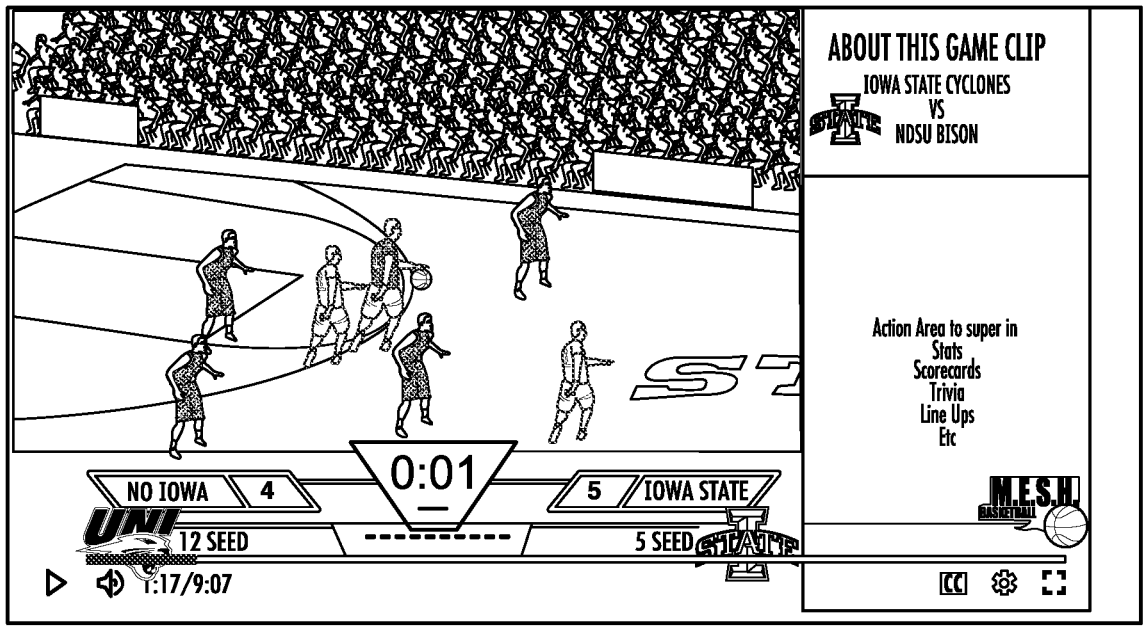

FIG. 10 illustrates the end of the opening clip in an M.E.S.H. game matching ISU VS UNI with ISU in possession of the clip vs North Dakota State Bison from 2017. This is the same clip shown in FIG. 9. Note that both MTeam ISU and MTeam UNI show points scored even though UNI has not yet been shown. This is due to NDSU scoring and their points being awarded to UNI due to crossover scoring.

Figure 11:
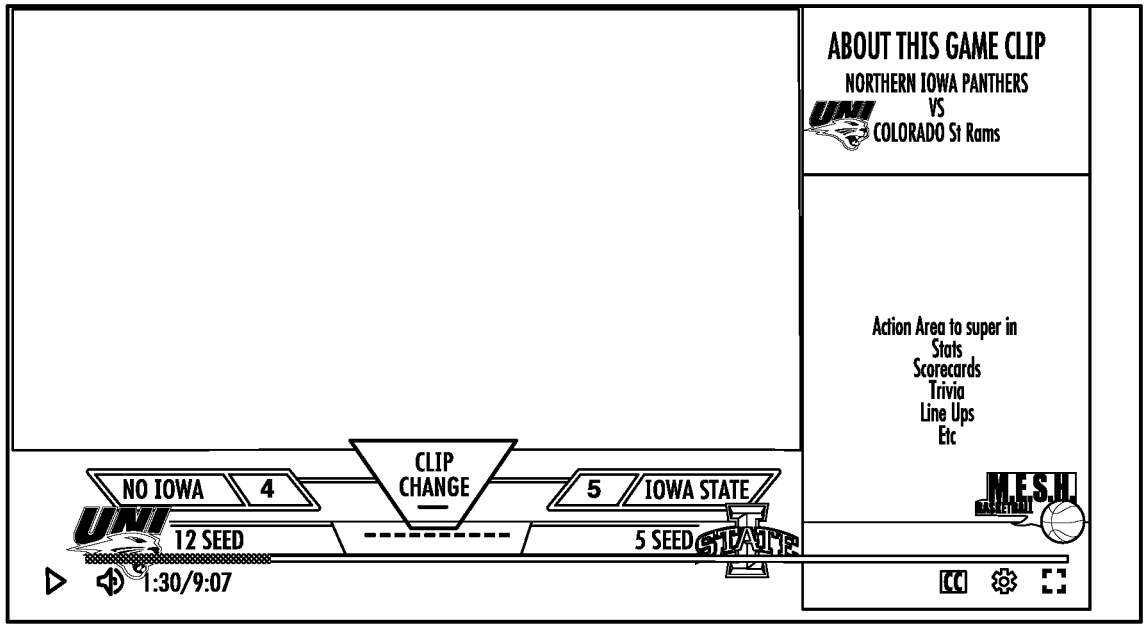

FIG. 11 shows a dark-screen clip change transition from the opening clip (ISU) to the second clip (UNI). Note the words "CLIP CHANGE" in the center of the figure. This is one of many clip change graphics that could be conceived.

Figure 12:
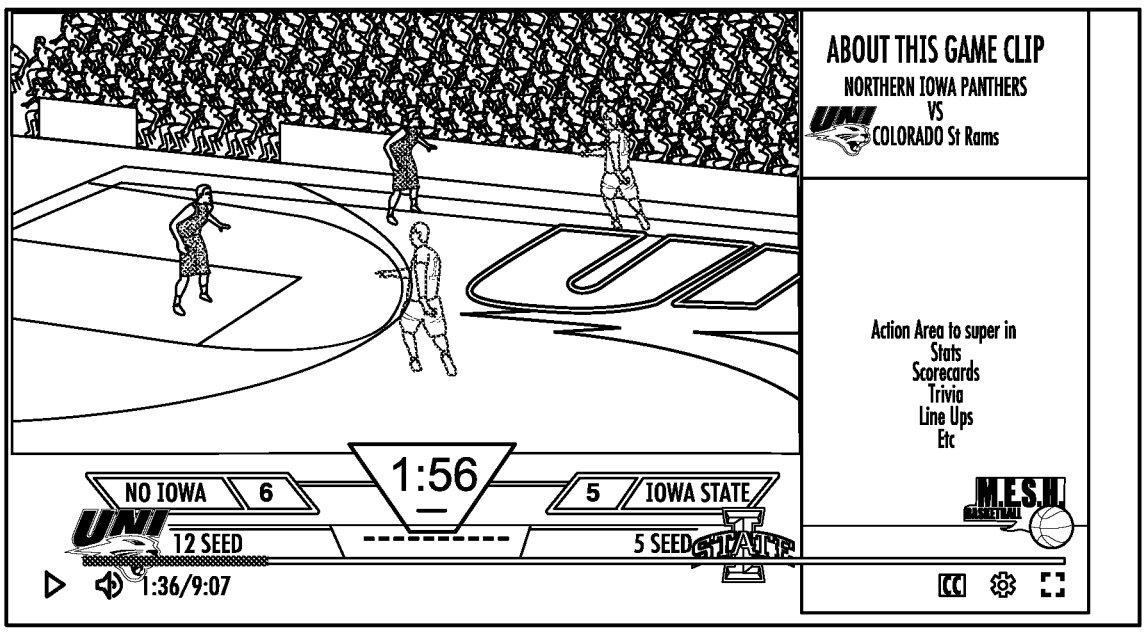

FIG. 12 illustrates the early stages of the second clip in the M.E.S.H. game matching ISU VS UNI. MTeam UNI is now in possession of the clip. It depicts UNI vs Colorado State Rams from 2017. Note that ISU's 5 points carries forward from the prior clip. UNI has scored 2 additional points making the score 6-5 in favor of UNI.

Figures 13, 14:
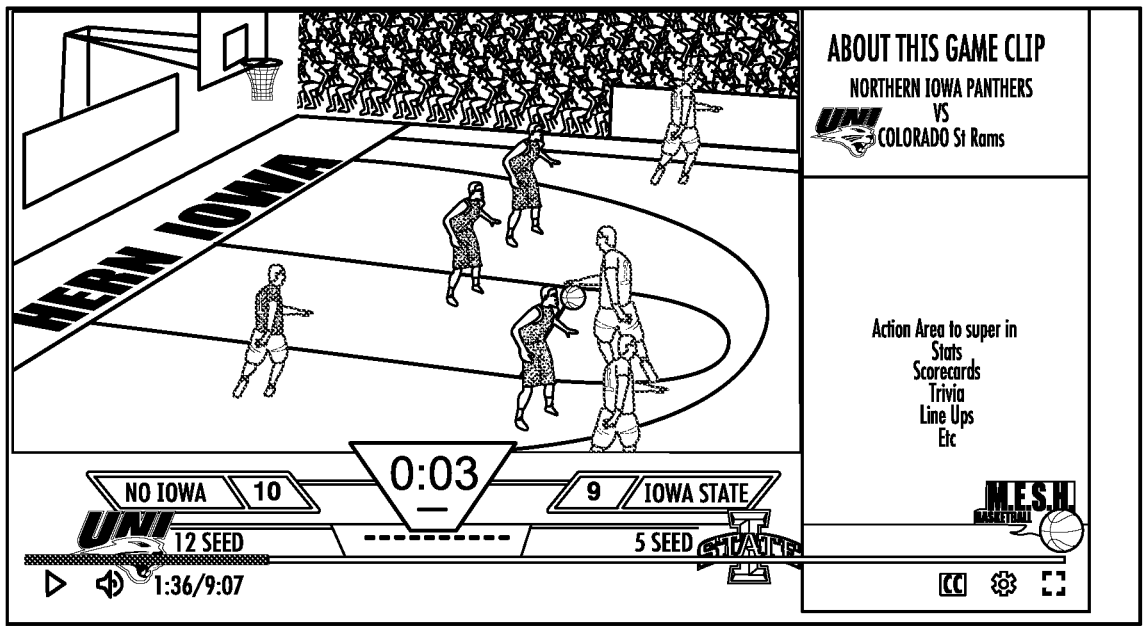

FIG. 13 illustrates a Commercial Break Feature. It is a placeholder for broadcasters to show commercials or any other content during breaks.

FIG. 14 illustrates the conclusion of the second clip in an M.E.S.H. game matching ISU VS UNI with MTeam UNI in possession of the clip vs Colorado State Rams from 2017. Note once again that both UNI and ISU have been scoring even though ISU does not appear in this clip. Once again, that is due to crossover scoring.

Figure 15:
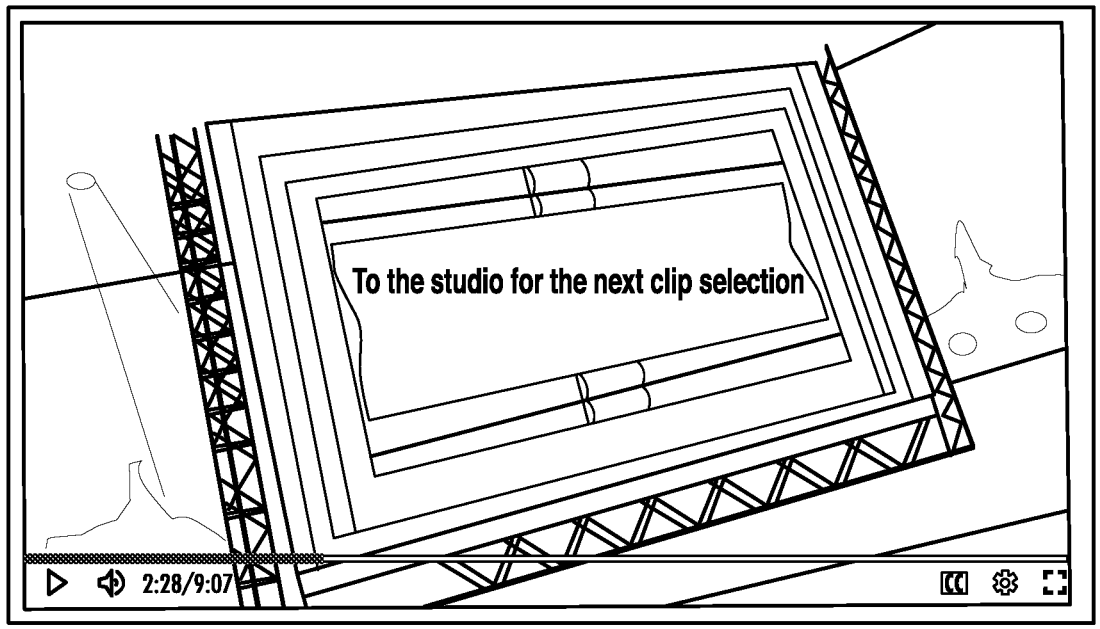

FIG. 15 illustrates a second variation of a clip change transition to go to a live studio shot for clip selection.

Figure 16:
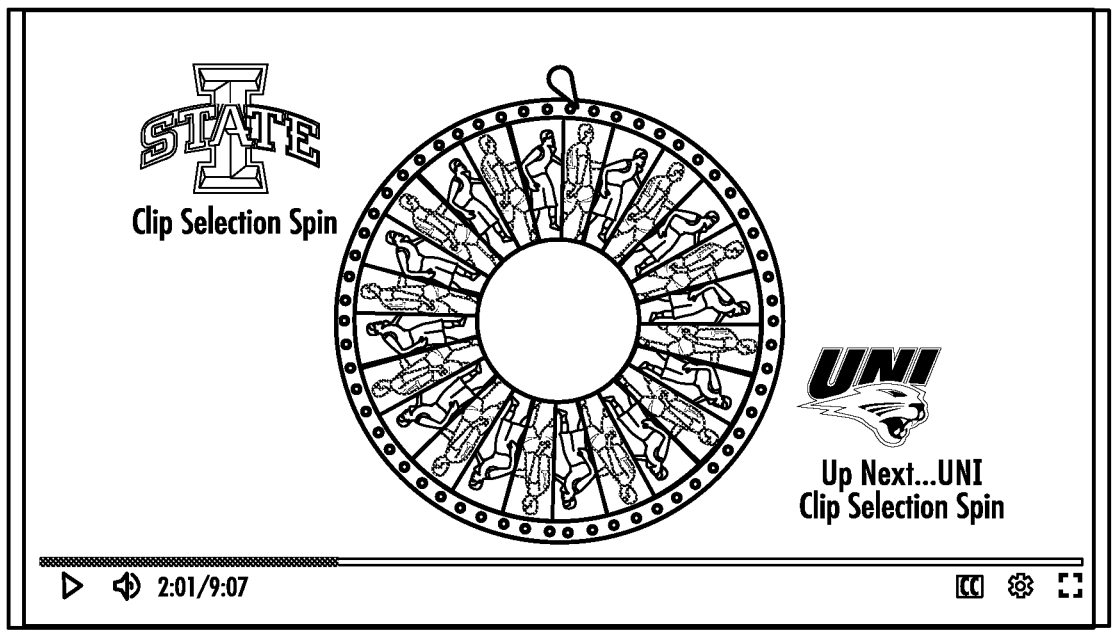

FIG. 16 illustrates a clip selection spinning wheel random clip selector while it is spinning. Each segment in the wheel would represent a possible historical game, from which a clip could be pulled for the upcoming time slice. The spinning wheel is done to randomize the overall outcome of the game and ensure the outcome remains unknown to the viewers for added drama and tension.

Figure 17:
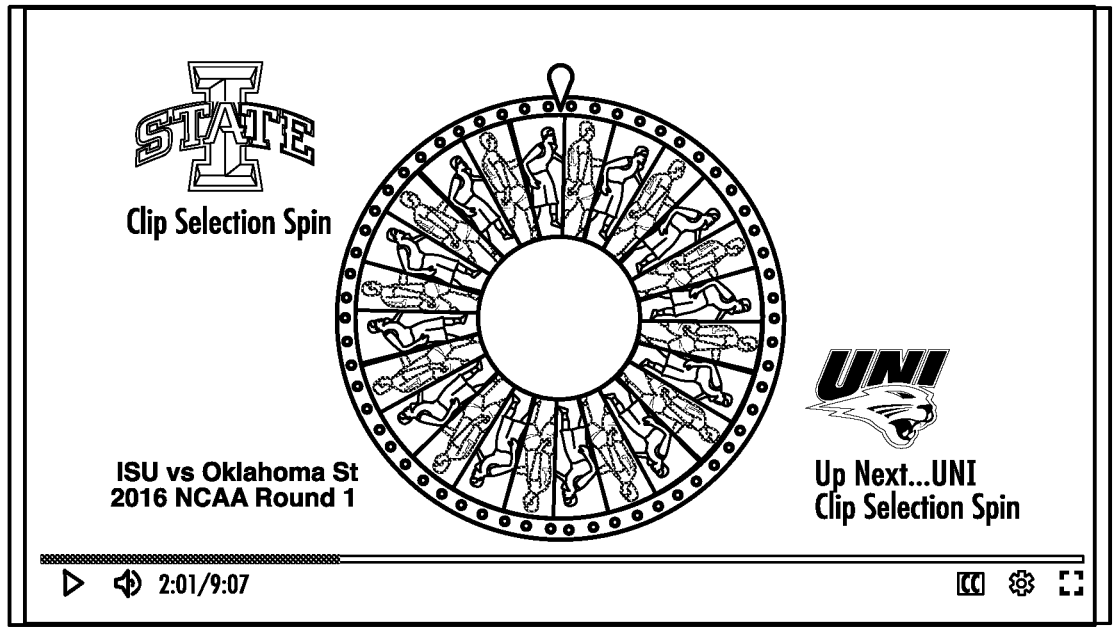
FIG. 17 illustrates the example clip selection spinner after it has stopped and selected Oklahoma State from 2016 as MTeam ISU's next clip.

FIG. 17 illustrates the clip selection spinner after it has stopped and selected Oklahoma State from 2016 as MTeam ISU's next clip opponent.

Figure 18:
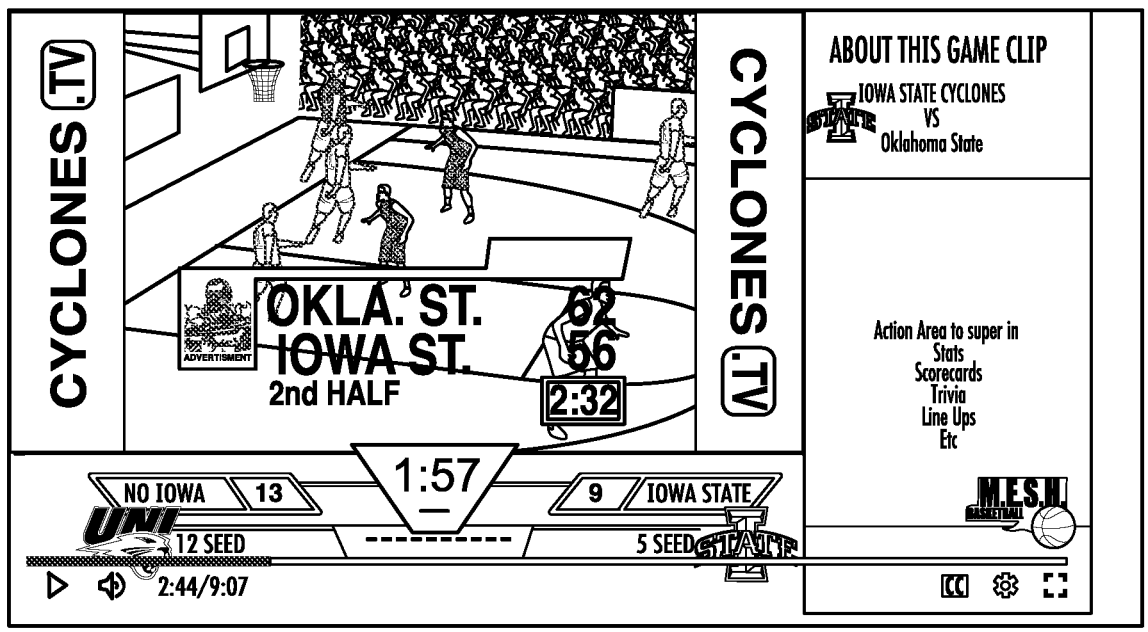
FIG. 18 illustrates ISU vs Oklahoma State in play from the previous FIG.'s clip selection.

FIG. 18 illustrates ISU vs Oklahoma State in play from the previous FIG.'s clip selection.

Figure 19:
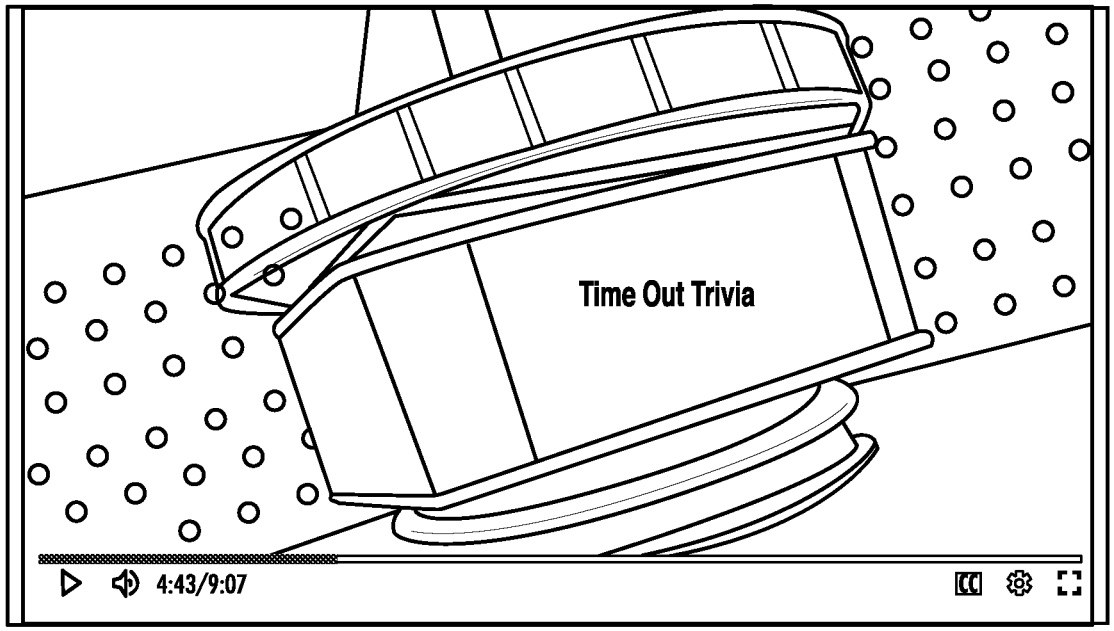
FIG. 19 illustrates an example time out graphic.

FIG. 19 illustrates a potential time out graphic. It is one of many that could be conceived.

Figure 20:
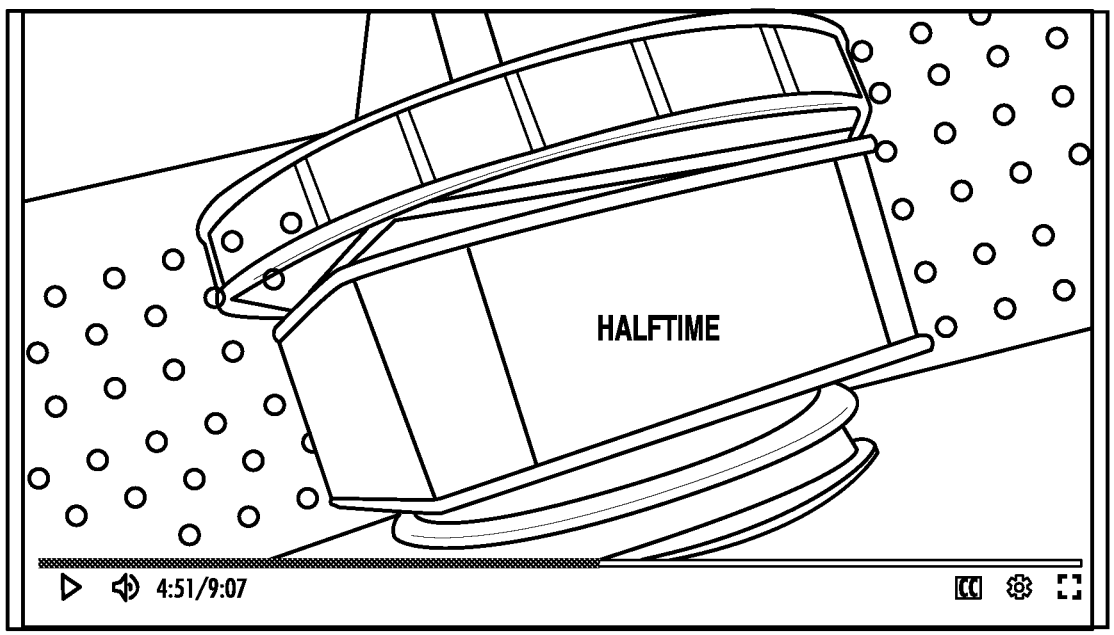
FIG. 20 illustrates an example halftime alert graphic.

FIG. 20 illustrates a halftime alert graphic. It is one of many that could be conceived.

Figure 21:
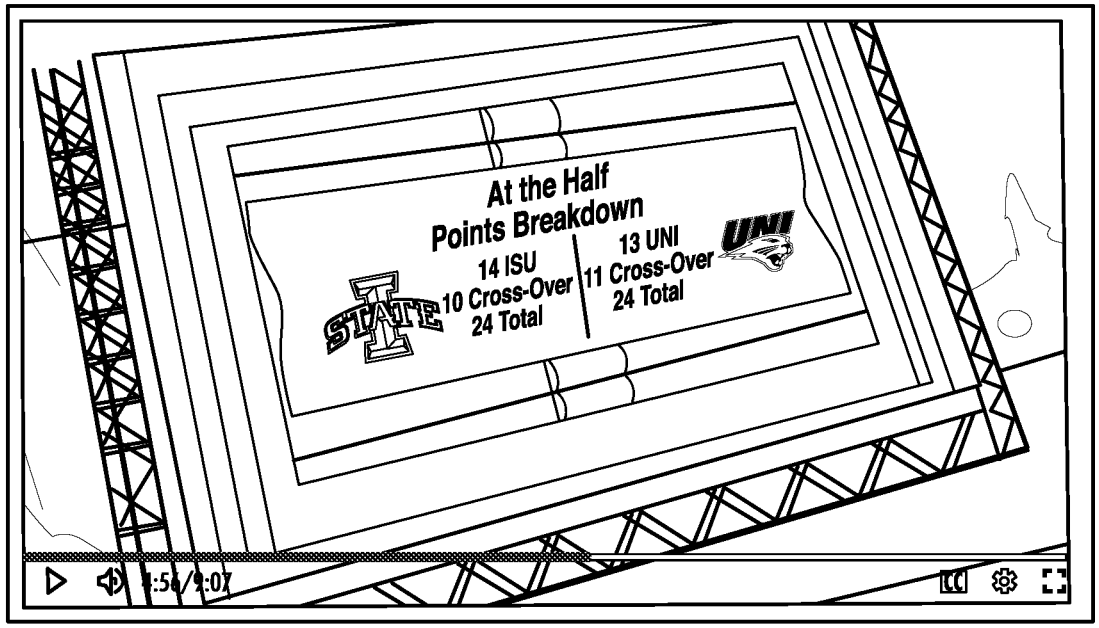
FIG. 21 illustrates crossover scoring and its contribution to each MTeam's total score at halftime.

FIG. 21 illustrates crossover scoring and its contribution to each MTeam's total score at halftime which is tied at 24. Note that MTeam ISU has 24 points total, 14 of which it visibly scored in its clips with 10 being crossover points being awarded from MTeam UNI's opponents. A similar situation exists with MTeam UNI with 13 of its own points plus 11 crossover points.

Figure 22:
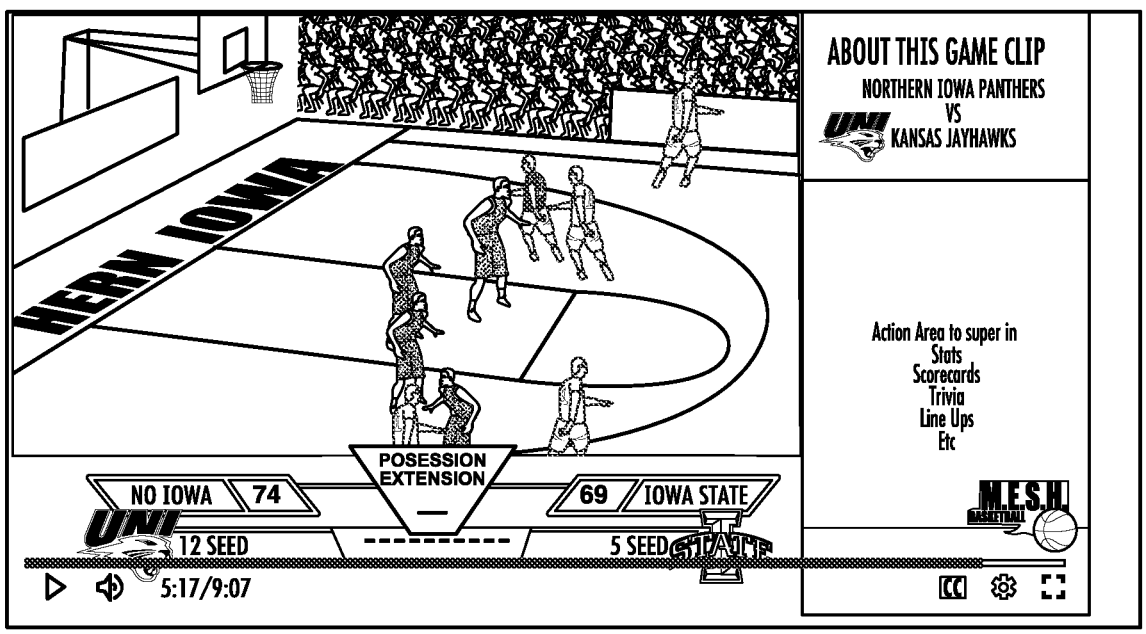
FIG. 22 illustrates a Possession Extension graphic designed for ending clips at the end of a possession after a set time length.

FIG. 22 illustrates a Possession Extension graphic designed for ending clips at the end of a possession after a set time length. In the example shown, the clip is from a historical game between UNI and the Kansas Jayhawks on UNI's home court. In this embodiment, clips run for a minimum fixed amount clock minutes but then, to ensure a graceful end, are allowed to run until the conclusion of the current possession. For example, if clips are set to be a minimum of 5 clock minutes, once the 5-clock minute mark is met, the clip goes into 'POSSESSION EXTENSION', which is noted on the scoreboard. At the end of the current possession, the clip will end.

Figure 23:
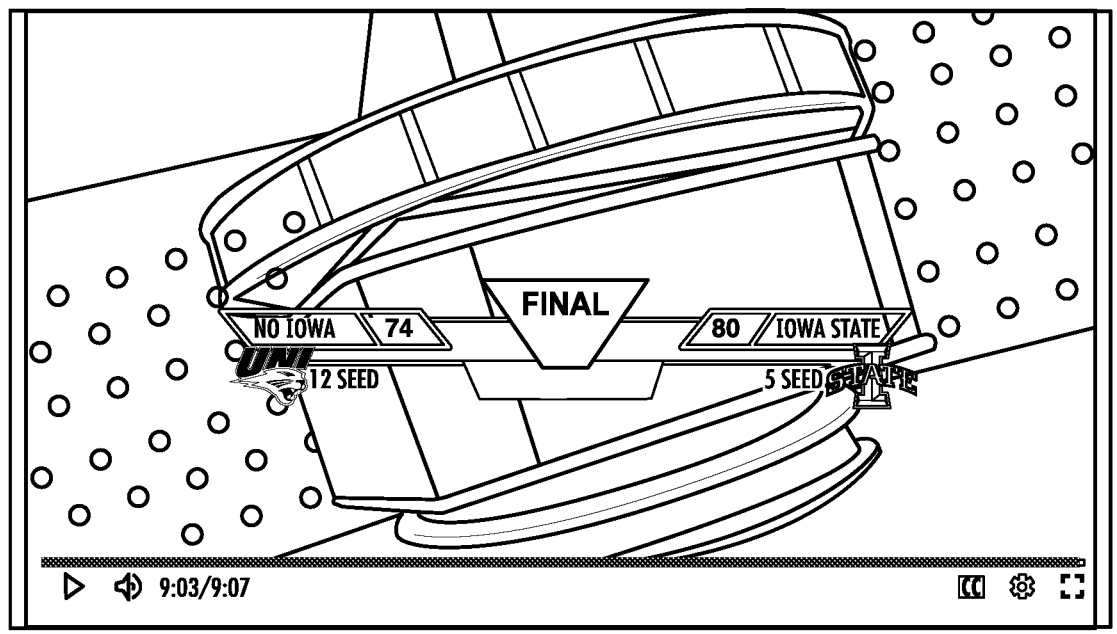
FIG. 23 illustrates a Final Score graphic for the two MTeams.

FIG. 23 illustrates a Final Score graphic for the two MTeams. It is one of many that could result depending upon the clips that are randomly chosen.

Figure 24:
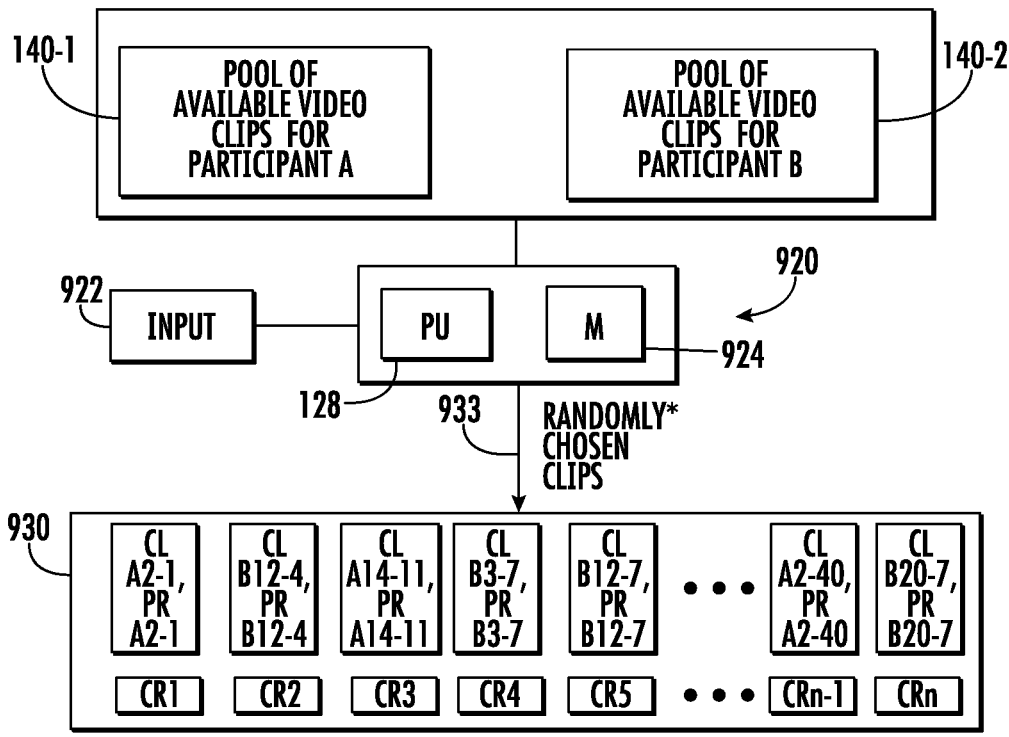
FIG. 24 is a diagram schematically illustrating portions of an example computing system for generating and presenting a video of a simulated competition between participants.

FIG. 24 schematically illustrates portions of an example computing system 920 for generating an example composite video competition 930 from example pools 140-1, 140-2 (collectively referred to as pools 140) of available video clips. Pools 140 are described above respect to system 120 in FIG. 2. Pools 140 contain historic videos involving the two participants, Participant A and Participant B (competing individuals or teams) of the composite video competition being generated. Pool 140-1 comprises historical videos of competitions involving Participant A. Pool 140-2 comprises historical videos of competitions involving Participant B.

As discussed above, each of the clips CL is that of a participant A or B from a particular historical competition. Each clip has an associated partial result PR contribution which contributes to the final result for the particular competition. The partial result may be in the form of a portion of the total number of points of a final score for a participant, such as points in a basketball game or in a football game. The partial result may be in the form of a measure that may lead towards a score. For example, partial result may be a particular amount of yards gained in a football game. The partial result may have multiple concurrent aspects. For example, a single partial result may be a number of yards gained, a first down and a score in clip constituting a portion of a football game. In the example illustrated, the resulting composite video competition 930 is composed of multiple clips.

By way of example, the competition 930 includes a clip CL A2-1, PRA2-1. This clip CL is a clip number 1 of a historical competition denoted with the number 2 and involving participant A. This clip has a corresponding partial result contribution PR, the letter A in that the partial result contribution is for the participant A, the number two means that the partial result contribution is from the historical competition denoted with the number 2 and the number 1 indicates that the partial result contribution is associated with the particular clip number 1 from the historical competition denoted with the number 2. This identification scheme is used throughout distinguish between different participants, different historical competitions, and different particular clips with their associated different partial results. The scheme is only utilized for purposes of explanation. It should be appreciated that other schema may likewise be utilized.

System 920 is operable in any one of multiple user selectable competition or presentation modes. In the example illustrated, system 920 additionally comprises an input 922 by which a user or users may select which of the various modes system 920 operates. Input 922 may comprise a touchpad, a keyboard, a display screen options that are selectively using a mouse, stylus and the like, a microphone with associated speech recognition, a pushbutton, slide bar or the like.

FIG. 24 illustrates system 920 operating in a first multi participant presentation mode in which the composite video competition comprises one channel or one stream of alternating turns or possessions by two different, A and B. In some circumstances and in some types competitions, a particular turn of a participant may comprise a single video clip. In some circumstances and in some types of competitions, a particular turn of the participant may comprise multiple consecutive video clips. For example, in a simulated basketball competition, a turn may comprise a single video clip showing an offensive possession for a particular participant. By way of another example, in a simulated football competition, a turn may comprise a series of consecutive clips, each clip being that of a down or play, wherein the series of consecutive clips may continue until the Participant ends his or her turn by scoring, punting, turning the ball over through a fumble or interception or upon the expiration of football game half.

Computing system 920 comprises process 128, described above, and memory 924. Memory 924 comprises a non-transitory computerized readable medium containing instructions for directing processing unit 128 to carry out each of the various selectable modes. Such instructions may be stored on nonvolatile memory such as a disk or a solid-state memory or flash memory. The instruction contained in memory 924 direct processing and 1282 randomly select different video clips from the pool 140-1 four participant A and from the pool 140-2 for participant B. As part of the example shown in FIG. 24, processing unit 12 a randomly selects a first video clip of a first historical competition involving the first participant A, wherein the first video clip has an associated first partial result contribution to a final result of the first historical competition. Processing unit 12 further randomly selects a second video clip of a second historical competition, different than the first historical competition and involving the second participant B. The second video clip has an associated second partial result contribution to a final result of the second historical competition.

The instruction contained in memory 924 further direct processing unit 128 to present at least the second video clip to a recipient. In addition, the instruction contained in memory 924 further direct processing unit 128 to present a current result for the simulated competition between the two participants A and B to the recipient. The current result comprising relative scores for the first and second participants, A and B, wherein the relative scores indicate a currently winning participant of the simulated competition as between at least the first participant and the second participant. The current result is based at least in part upon the first partial result contribution and the second partial result contribution.

For example, a recipient may be presented with a video clip depicting participant A scoring three points, the three points constituting a partial result contribution contributing to a final score of 27-6 as between Participant A and a competitor (Participant B or a different competitor C1) in a first historical competition. The current score of the simulated competition between participant A and B may be 31-9, wherein the 31 points for Participant A is based upon the partial result contribution of three points from the historical competition and 28 other points derived from partial result contributions associated with other video clips from the same or different historical competitions involving Participant A, with Participant B, with competitor C1 and/or other competitors C2 . . . Cn. The particular current or running score for Participant B may likewise be determined based upon the partial result contributions associated with different clips from different historical competitions involving Participant B against Participant A and/or other competitors. In some circumstances, additional scoring may occur during the simulated competition resulting in a different final score as between Participants A and B.

As shown by FIG. 24, when operating in a first multi participant presentation mode, computing system 920 outputs video competition 930. Composite video competition 930 comprises a recorded series of clips, wherein the entire simulated composition is completed and stored prior to transmission and presentation to the recipient or an ongoing live stream of a series of clips, wherein the random selection of clips and the concatenation of clips may be ongoing while the previous randomly selected and concatenated clips are being presented to the recipient. In some implementations, the composite video competition 930 may be stored for viewing by multiple different recipients at different times. In some implementations, the composite video competition may be concurrently presented to multiple recipients, for example, first recipient is a fan of Participant A and a second recipient who is a fan of Participant B. In the example multi participant presentation mode illustrated, a single individual recipient is presented with the video clips depicting all of the usually alternating turns (discussed above) of both of the participants A and B in the simulated competition. Said another way, a first recipient who is a fan of Participant A is presented with video clips depicting portions of historical competitions involving Participant B, and a second recipient to the fan of Participant B is presented with video clips depicting portions of historical competitions involving Participant A.

In the example illustrated, the simulated competition represented by the composite video competition 930 presents the example series of clips for Participants A and B. As such clips are presented, the ongoing, running or current score or other result of the simulated competition as between Participants A and B is also presented. The current score or other result may be presented immediately before, during and/or after presentation of a clip. In some implementations, the current score or other result may presented before, during or after a predetermined number of clips have been presented, such as before, during or after every third video clip or the like. In some implementations, the current score or other result may be presented at particular time intervals in the simulated competition. In some implementations, the current score of the result may presented in response to a clip having a particular characteristic. For example, the current score may be depicted in response to the presentation of a clip depicting a score in a football game, whereas the current score may not be presented in association with other clips merely depicting plays or yardage gains. As should be clear, the current score may be different than that of the partial result contribution depicted by the particular video clip and may be different from any score that occurred in the historical competition from which the video clip was drawn and later randomly selected.

In some implementations, the current result CR at the point in time of the simulated competition corresponding to the presentation of a particular video clip may be presented as a separate clip before after the particular video clip. In some implementations, the current result CR at the point in time of the simulated competition corresponding to the presentation of the particular video clip may be presented concurrently with the particular video clip. For example, the current result CR may presented above, below or to a side of the particular video clip, or may be overlaid on top of a portion of the particular video clip.

Although computing system 920 is discussed above with respect to an example in which the simulated competition is between two participants A and B, in other implementations, system 920 may likewise present a composite video competition presenting a simulated competition between more than two participants. For example, the simulated competition may between a pool or group of participants comprises three or more teams.

Figure 25:
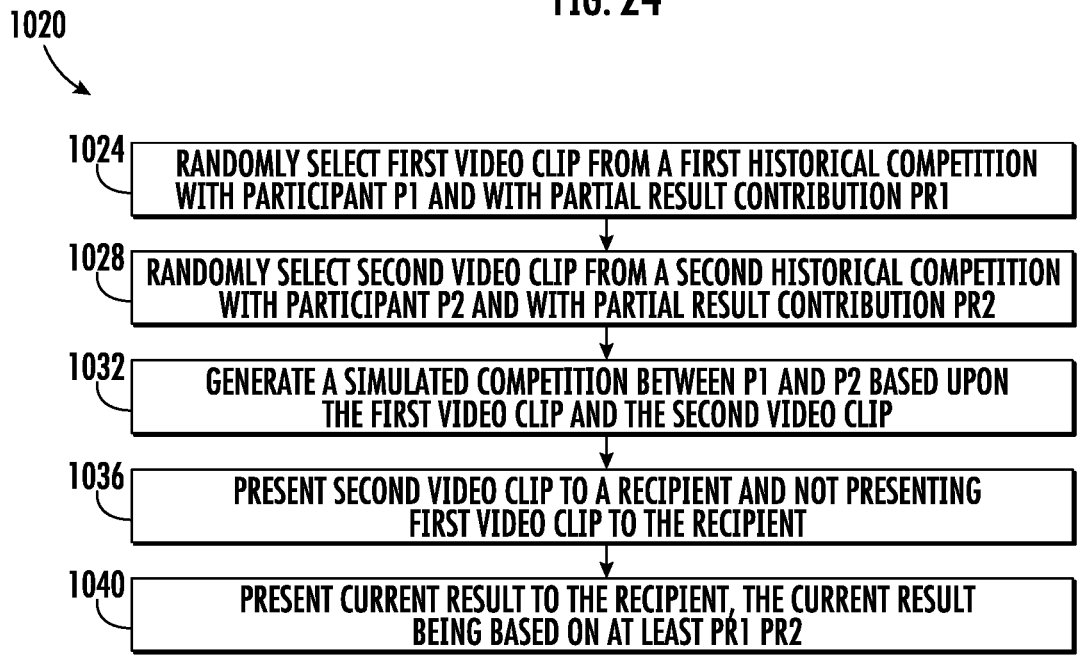
FIG. 25 is a flow diagram of an example bifurcated presentation mode of the system of FIG. 24.

FIG. 25 is a flow diagram illustrating a bifurcated presentation mode 1020 that may be carried out by computer system 920. With the bifurcated presentation mode, system 920 does not present (or store) all of the randomly chosen video clips that form the simulated competition to the recipient, or multiple recipients. Rather, a particular recipient may be presented with only those video clips associated with an individual participant (chosen by the recipient in some implementations). In other words not required to view all of the randomly chosen video clips are both Participants that form the simulated competition. For example, a recipient who is a fan of Participant A in the simulated competition may only be presented with those video clips depicting Participant A. The recipient is not presented with those video clips depicting Participant B. However, despite the recipient only viewing those video clips depicting the first participant, the current score being presented to the recipient will reflect or be based upon not only the partial result contributions from the video clips presented to the recipient, but also upon the partial result contributions from the randomly chosen video clips depicting the second participant. As a result, a greater amount of content may be presented to the recipient in a shorter amount of time, or the time to present simulated competition may be shortened. Moreover, the recipient may be present with the video clips that he or she may be more interested in.

As indicated by block 1024, processing unit 128, following instructions contained in memory 924, randomly selects a first video clip from a first historical competition with a participant P1 and with a partial result contribution PR1. As indicated by block 1028, processing unit 128 further randomly selects a second video clip from a second historical competition (the same as or different than the first historical competition) with the participant P2 and with the associated partial result contribution PR2.

As indicated by block 1032, processing unit 128, following instructions contained in memory 924, generates a simulated competition between the participants P1 and P2 based upon the first video clip and the second video clip. As should be appreciated, the simulated competition may be based upon additional video clips depicting the two participants, the additional video clips having corresponding partial result contributions. As discussed above, the partial result contributions from the different video clips which had previously contributed to the final result of the historical competitions now contribute to a current result and a final result for the simulated competition.

As indicated by block 1036, the second video clip, depicting the second participant P2 is presented to a recipient (a viewer). In contrast, the first video clip depicting the first participant P1 Is not presented to the viewer as part of the simulated competition. As indicated by block 1040, a current result is presented to the recipient. The current result is based upon at least Pr1 and PR2.

System 920 may additionally be operable in a hybrid mode, wherein a first portion of the simulated competition is presented to a recipient in a bifurcated mode and a second portion of the simulated composition is presented to the recipient in a blended or multi-participant viewing mode. For example, in some implementations, at a predetermined point in time in the simulated competition, system 920 may automatically switch from the bifurcated mode discussed above to the multiparticipant presentation mode discussed above in which the viewer is presented with the randomly chosen video clips depicting the turns of both Participants. In some implementations, the predetermined point in time may be input by a viewer the input 922. For example, user may indicate that system 920 is to switch from the bifurcated mode to the multi-participant presentation mode with the last five minutes of the simulated competition or the last half of the simulated competition. In some implementations, system 920 may switch between the bifurcated mode and the multiparticipant presentation mode at any time in the simulated competition in response to an input or command received by the recipient via input 922.

In some implementations, system 920 may automatically switch between the modes in response to certain current results for example, in response to a scoring margin exceeding a predetermined threshold or being less than a predetermined threshold, system 920 may automatically switch between modes or operate in a particular mode. For example, if the scoring margin in response to the scoring margin being less than a predetermined threshold, a close score competition, system 920 may automatically switch to a multiparticipant viewing or presentation mode.

Figure 26:
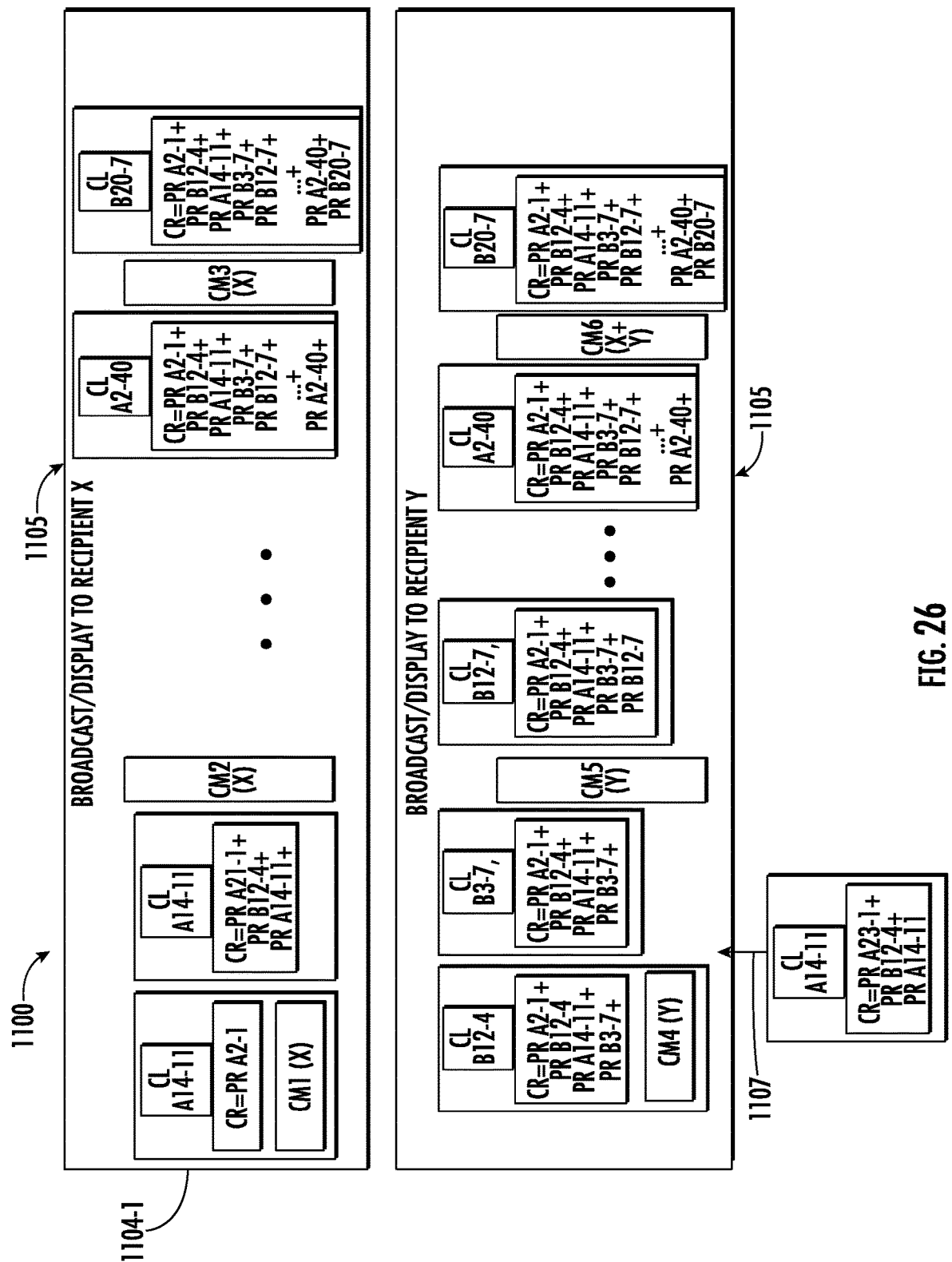
FIG. 26 is a diagram schematically illustrating a hybrid mode for the system of FIG. 24.

FIG. 26 is a diagram schematically illustrating one example of the blending of the two modes during presentation of a single simulated competition to two recipients, a Recipient X who is more interested in Participant A and a Recipient Y who is more interested in Participant B. FIG. 26 illustrates a first stream or channel 1104-1 broadcast, displayed or presented to Recipient X and a second stream or channel 1104-2 broadcast, displayed or presented to Recipient Y. Represent a series switch or presented to a viewer independent of the other stream. As discussed above, one or both of the streams 1104 may be pre-generated and pre-stored, wherein all of the video clips are preestablished prior to initiation of viewing by a particular recipient. Alternatively, one or both of the streams 1104 may be live in that the series of video clips forming the stream are being concurrently randomly chosen and concatenated while previously randomly chosen concatenated video clips of the stream are being viewed by the recipient. In some circumstances, the two Recipients X and Y may begin viewing their respective streams 1104-1 and 1104-2 at different real-world times.

In some implementations, system 920 may provide either of recipients X or Y with the ability to rewind or fast-forward through the stream 1104-1 or 1104-2 using input 922. In some implementations, system 920 may permit a Recipient to input a particular point in time of the simulated competition at which viewing of the stream 1104 is to begin. For example, Recipient X may provide an input that causes the system 920 to begin presenting stream 1104-1 during only the second half of the simulated competition, wherein first randomly chosen video clips of the stream 1104-1 presented to the Recipient X are those which begin following halftime of the simulated competition.

Stream 1104-1 comprises the series historical video clips from prior historical competitions presented to Recipient X as part of the single simulated competition 1100 being presented to both recipients X and Y. Stream 1104-2 comprises the series historical video clips from prior historical competitions presented to Recipient Y as part of the single simulated competition 1100 being presented to both Recipients X and Y.

As shown by FIG. 26, the simulated competition 1100 (the composite video competition) includes the presentation of first randomly chosen clip CL A2-1 (a clip identified with the clip number 1 from a historical competition identified with number 2 involving Participant A). The clip CL A2-1 is part of the stream 1104-1. The clip number does not necessarily mean that the clip is the very first video clip of the historical competition nor does it mean that it is the first clip of the simulated competition. This clip is presented to the Recipient X, but is not presented to the Recipient Y. During the presentation of the clip to the Recipient X, the current result for the simulated competition is presented proximate to the presentation of the particular clip. In the example illustrated, the clip is the first clip of the simulated competition. As a result, the current result CR constitutes a partial result associated with the clip, PR A2-1, and is presented proximate to the presentation of the clip. In the example illustrated, the current result is presented on the display screen below a window containing the clip. As further shown by FIG. 26, a first advertisement or commercial CM1 is presented proximate to the presentation of the video clip CL A2-1. The commercial may be presented immediately before, immediately after, along a side of below or overlaid upon portions of the clip being presented. As indicated by the letter X in parentheses, the commercial is a targeted commercial, one that is based upon the identity or known characteristics or preferences of the Recipient X.

The simulated competition 1100 further comprises the presentation of a second randomly chosen video clip CL B12-4 (a clip identified with the clip number 4 from a historical competition identified with number 12 involving Participant Y). The video clip CL B12-4 is part of stream 1104-2. The clip number 4 does not necessarily mean that the clip is the fourth video clip of the historical competition nor does it mean that it is the fourth clip of the simulated competition. This clip is presented to the Recipient Y, but is not presented to the Recipient X. The video clip CL B12-4 constitutes the second video clip of the simulated competition, but the first video clip presented to Recipient Y.

During the presentation of the clip CL B12-4 to the Recipient B, the current result for the simulated competition is presented proximate to the presentation of the particular clip. In the example illustrated, the clip is the second clip of the simulated competition. As a result, the current result CR constitutes a combination of the partial result PR A2-1 and PR B12-4, and is presented proximate to the presentation of the clip CL B12-4. In the example illustrated, the current result is presented on the display screen below a window containing the clip. As further shown by FIG. 26, a second advertisement or commercial CM4 is presented proximate to the presentation of the video clip CL B12-4. The commercial may be presented immediately before, immediately after, along a side of below or overlaid upon portions of the clip being presented. As indicated by the letter Y in parentheses, the commercial is a targeted commercial, one that is based upon the identity or known characteristics or preferences of the Recipient Y.

The next or third randomly chosen historical video clip forming part of the simulated competition 1100 is the video clip CL A14-11 (depicting Participant A and constituting a particular video clip designated with number 11 drawn from a particular historical competition designated with the number 14) and presented as part of stream 1104-1. Being the third randomly chosen video clip of the simulated competition 1100, processor 128 displays the current result CR proximate to the display of the video clip CL A14-11, wherein the current result is the combination of the partial results from the current video clip being presented in all of the prior video clips presented to both Recipients X and Y (streams 1104-1 and 1104-2). In the example illustrated, the particular current result at such time is the combination of PR A2-1, PR B12-4 and PR A14-11. The combination may be the summing of individual point values of the partial result contributions.

The next or fourth randomly chosen historical video clips forming part of the simulated competition 1100 is the video clip CL B3-7 depicting Participant A and constituting a particular video clip designated with number 7 drawn from a particular historical competition designated with the number 3) and presented as part of stream 1104-2. Being the fourth randomly chosen video clip of the simulated competition 1100, processor 128 displays the current result CR proximate to the display of the video clip B3-7, wherein the current result is the combination of the partial results from the current video clip being presented in all of the prior video clips presented to both Recipients A and B (streams 1104-1 and 1104-2). In the example illustrated, the particular current result at such time is the combination of PR A2-1, PR B12-4, PR A14-11 and PR B3-7, the partial result contributions associated with video clips CL A2-1, CL B12-4, CL A14-11 and CL B3-7, respectively. The combination may be the summing of individual point values of the partial result contributions.

As further shown by FIG. 26, following particular video clips, commercial clips may be inserted into the series of video clips. For example, stream 1104-1 comprises a commercial clip CM2 which follows the video clip CL 14-11. As the stream 1104-1 is being presented to Recipient X, the commercial clip may also be targeted are focused to the particular interests, preferences or characteristics of the Recipient X. Stream 1104-2 is illustrated as having a commercial clip CM5 following the video clip CL B3-7. As the stream 1104-2 is being presented to Recipient Y, the commercial clip may also be targeted are focused to the particular interests, preferences or characteristics of the Recipient Y.

The above-described example pattern or sequence of presenting video clips to the two recipients X and Y in the bifurcated mode may continue until system 920 switches from the bifurcated mode to the blended or multi-participant presentation mode. As discussed above, the switching from one mode to the other may occur automatically or may occur in response to commands received via input 922. In the example illustrated in FIG. 26, system 920 switches to the multi-participant presentation mode at a point in time 1105 in the simulated competition 1100. At such time, both Recipients X and Y are presented with all of the same randomly chosen video clips depicting both Participants A and B in the simulated competition 1100. Both Recipients view all of the turns of Participants A and B from the point in time 1105 at which system 920 enters the blended mode. Switching to the multiparticipant presentation motor blended mode may increase suspense by delaying the final score of a simulated competition and may allow fans of one Participant to root against the other Participant or Participants.

Both of the separate streams 1104-1 and 1104-2 may continue to include advertiser commercials either embedded into, but below, alongside or partially overlaid in the presented randomly chosen video clips or inserted between video clips. In some implementations, those commercials inserted into stream 1104-1 and those commercials inserted into stream 1104-2 during the blended portion of such streams (those portions of the streams 1104 depicting both of the Participants) may remain different in that the commercials inserted into the blended portion of stream 1104-1 continue to be targeted to Recipient X and that those commercials inserted into the blended portion of Stream 1104-2 continue to be targeted to Recipient Y. In the example illustrated, the commercial CM3 inserted into stream 1104-1 is targeted to Recipient X. In some implementations, the commercials inserted into the blended portion of the streams may be generic or may be targeted to both Recipients X and Y. In the example illustrated, the commercial CM6 inserted into stream 1104-2 is generic or is targeted to both Recipients X and Y.

As indicated by arrow 1107, either of Recipients X or Y, at any time during the broadcast or display, may provide a command or input via input 922 requesting system 922 present one or more video clips from the other streams (of the other Participant) at the particular point in time in the simulated competition. For example, following the presentation of video clip CL B12-4 or following the presentation of video clip CL B3-7, the Recipient Y may provide input via input 922 requesting that he or she be presented with the video clip CL A14-11, which will then be presented as part of the stream 1104-2. By way of example, the particular recipient Y may see from the current result being presented with video clip B3-7 that Participant A had a pivotable or huge score. This feature allows the Recipient Y to provide an input to view the pivotal or huge score by the Participant A who is competing against Participant B in the simulated competition. Thereafter, stream 1104 may automatically return to the bifurcated mode or may continue in the multiparticipant presentation or blended mode, depending upon default settings of system 920 and/or further input via input 922.

In each of the above examples, system 920 is illustrated and described as presenting to streams 1104 to two Recipients X and Y, each of stream 1104 having a bifurcated mode portion in which video clips depicting a single one of the participants in the simulated competition is broadcast are presented. In other implementations, the simulated competition may between more than two Participants. In such implementations, more than two different streams 1104 may be generated by system 920 and presented to the more than two recipients. For example, a simulated competition may be between Participants A, B and C. Recipient X may receive first stream of randomly chosen video clips having at least a portion that depicts only Participant A (with the combined partial result contributions from all of the Participants, or at least two of the participants). Likewise, Recipient Y may receive a second stream of randomly chosen video clips having at least a portion that depicts only Participant B. Recipient Z may receive a third stream of randomly chosen video clips having at least a portion that depicts only Participant C. In such implementations, the three different streams directed to the different recipients may merge (switch to the multiparticipant presentation mode).

In some implementations, assimilated competition may comprise a "play in" tournament involving more than two teams, wherein three teams, for example, are simultaneously vying for last open position in a tournament. In such an implementation, each of the three teams may simultaneously compete against one another for the final spot. The partial result contributions occurring during their individual turns would contribute to the overall final score or measurement for each of the three teams, wherein the scores for each of the three teams would be compared against one another to determine a winner.

Figure 27:
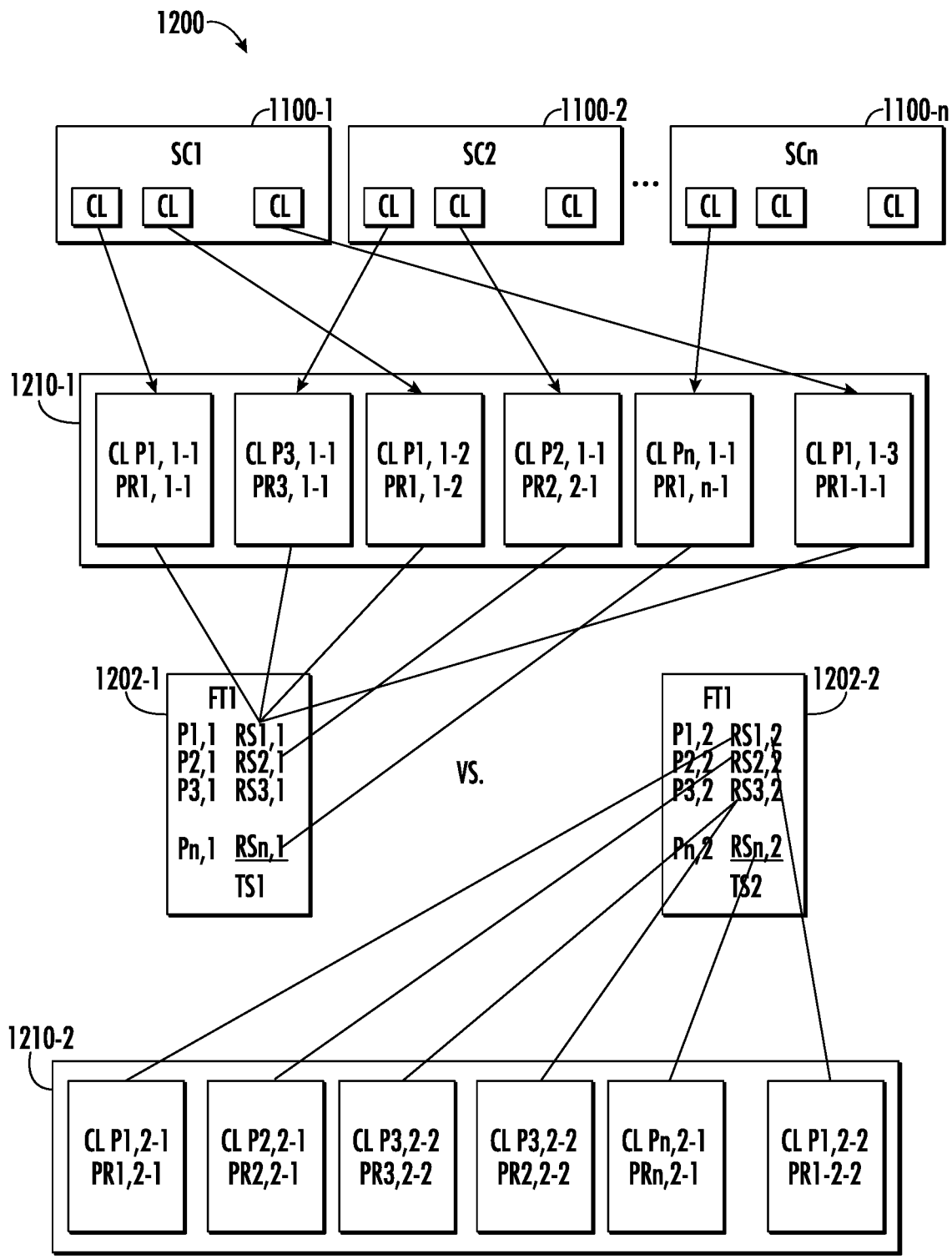
FIG. 27 is a diagram schematically illustrating an example fantasy competition mode for the system of FIG. 24.

In some implementations, system 920 may be actuatable in a individual player fantasy competition mode. FIG. 27 is a diagram schematically illustrating system 920 operating in one example fantasy team or competition mode 1200. When operating under mode 1200, system 920 prompts persons to create their own fantasy teams made up of multiple players from different actual real-life teams (Participants from historical competitions). The multiple players comprise real-life players from the Participants in the historical competitions. Such selection may be through a draft amongst various persons in a league or may be made in other fashions. In the example illustrated, a first person has created a first fantasy team 1202-1 consisting of players P1,1 . . . Pn,1. A second person has created a second fantasy team 1202-2 consisting of players P1,2 . . . Pn,2. A player may be in various forms. For example, in a fantasy football league, a player may comprise a tight end, a wide receiver, a running back, a kicker, a defense and/or a flex position (filled by any of a tight end, wide receiver a running back.

As shown by FIG. 27, once the fantasy teams 1200 are selected, system 920 may define a season of competition between different matchups of different pairs of Participants. Each week of a "season" may involve a series of simulated competitions (similar to the simulated competition 1100 described above) between pairs of Participants. For each simulated competition SC1, SC2 . . . SCn between pairs of participants, system 920 may randomly select various portions or video clips CL from various historical competitions involving each of the two participants as described above. These randomly chosen video clips CL have associated partial (described above that contributed to the final result of the historical competition.

In contrast to the bifurcated mode or the multiple participant presentation mode, system 920, in the fantasy team mode, further filters the various video clips CL from the generated simulated competitions SC to extract only those clips that depict particular players on the fantasy teams 1200. In the example illustrated, a channel or stream 1210 is presented for each of the fantasy steams 1200. Stream 1210-1 is presented, displayed or broadcast to the person who established fantasy team 1202-1. Stream 1210-1 presents a series of video clips depicting those individual players on the fantasy team 1202-1. Each clip may have an associated partial result contribution corresponding to the partial result contribution to the final result of the original historical competition in which the player participated. This partial result contribution may have a corresponding fantasy point value. For example, in a fantasy football mode, and a point per reception (PPR setting), a catch may be worth a single fantasy point and every yard of the reception may be worth 0.1 fantasy points.

As the different video clips of those players on a particular fantasy team are presented, system 920 may also output a running score RS for each individual player on the particular fantasy team and a total running score for the fantasy team. The running score for each particular player is determined based upon the partial result contributions from the extracted video clips for each particular player. For example, the fantasy player P1,1 (the player designated with the number 1 on the first fantasy team designated with the number 1) has a corresponding running score of RS1,1 which is based upon a combination of the partial result contributions PR1,1-1, PR1,1-2 and PR1,1-3 from the extracted video clips CL P1,1-1; CL P1,1-2 and CL P1,1-3, respectively, wherein the final number simply designates that the video clips are different from one another.

The sum of the running scores of the individual players on a fantasy team constitutes a total running score TS for the fantasy team. Once all of the simulated competitions have been completed and all of the video clips depicting the players on the two fantasy teams have been extracted from the video clips randomly chosen to form the simulated competitions, a winner may be declared between the two competing fantasy teams by comparing their final running total scores TS. This process may be carried out for more than two fantasy teams that have combined to form a league. Records may be kept for each fantasy team to determine overall league winner. Ties may be determined by evaluating the total number of points scored by a fantasy team during a season.

In some implementations, system 920 may generate a multitude of simulated competitions different pairs of Participants for each day or each week of the simulated season. Prior to the simulated season, individuals may draft or otherwise select sets of various players from the different Participants to form fantasy teams of players that may comprise an amalgamation of multiple different players from multiple different teams/Participants. During a particular day or week of the simulated season, system 920 may generate a simulated competition between different fantasy teams. Using the partial result contributions from the various simulated competitions between different pairs of Participants, system 920 may assign point values to the individual players on each of the different fantasy teams. As the multiple simulated competitions progress through the day or through the week, a current running score as between different fantasy teams may be presented. Along with the running score, those video clips from the simulated competitions that depict a fantasy team player may be presented in a concatenated fashion or in series to the two individual/recipients that established the fantasy teams.

Figure 28:
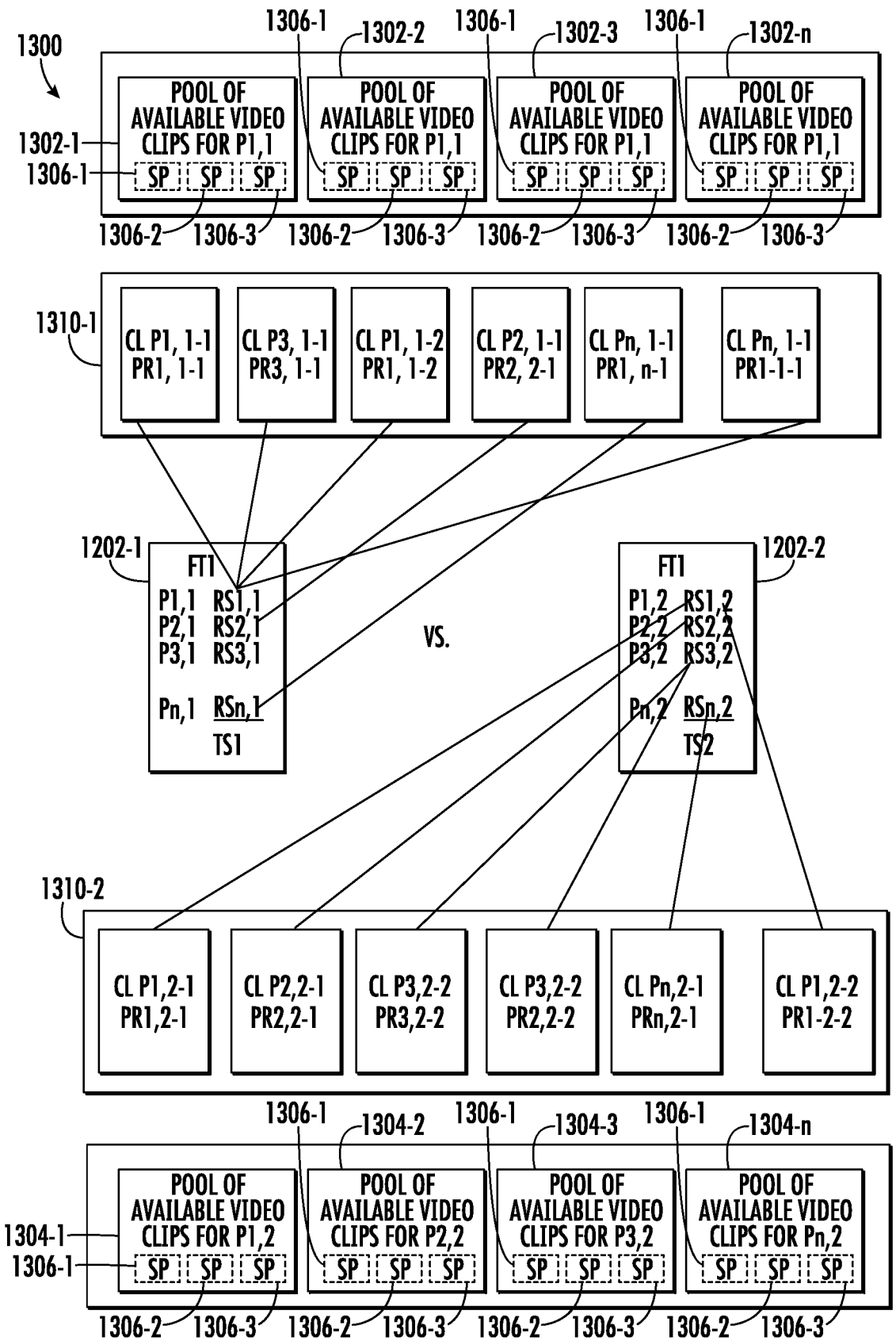
FIG. 28 is a diagram schematically illustrating an example fantasy competition mode for the system of FIG. 24.

FIG. 28 illustrates another example fantasy team mode 1300 that may be carried out by system 920. Mode 1300 is similar to mode 1200 except that rather than first generating a multitude of different simulated competitions between different Participants or teams who participated in the historical competitions from which the video clips are taken, and then filtering out those video clips of the simulated competitions that depict particular players on the fantasy teams to determine the fantasy player scores and the total tank fantasy team scores, system 920 randomly chooses video clips from a pool of available video clips for each player. In the example illustrated, system 920 randomly selects video clips for those players P1, P2, P3 . . . Pn on fantasy team 1202-1 from pools 1302-1, 1302-2, 1302-3 and 1302-n, respectively. Likewise, system 920 randomly selects video clips for those players P1, P2, P3 . . . Pn on fantasy team 1202-2 from pools 1304-1, 1304-2, 1304-3 and 1304-n, respectively. The randomly chosen video clips are presented as a series or stream of clips for each fantasy team. In the example, stream 1310-1 is presented on a display for fantasy team 1202-1 and stream 1310-2 is presented on a display for fantasy team 1202-2.

The pools 1302, 1304 of available video clip for each player is derived from video clips from prior historical competitions, described and defined above. For example, a first pool of video clips may contain a set of video clips depicting P1,1 from a prior season, a prior set of seasons or the particular player's entire career. In some implementations, as shown in broken lines, the pool of available video clips for each particular fantasy player may be broken down into or include subsets or sub pools 1306-1, 1306-2, 1306-3 (collectively referred to as sub pools 1306) of clips, wherein for a first simulated fantasy competition, system 920 may randomly draw video clips from a first sub pool 1306-1 and for a second simulated fantasy competition between fantasy teams, system 920 may randomly draw video clips from a second sub pool 1306-2 of video clips for the particular player. Different sub pools 1306 of video clips may contain video clips that depict the player performing against different levels (such as poor, average and superior) of competition or against particular opponents or competitors. In such a manner, a player's fantasy point performance may vary from fantasy match up to fantasy matchup and from week to week or so depending upon which of the sub pools 1306 from which the video clips are to be randomly chosen.

In some implementations, a player may select a fantasy team defense, wherein the quality of one's defense may impact from which sub pool 1306 an opponent fantasy team draws or randomly selects video clips when the opponent fantasy team plays or competes against the fantasy team having the selected defense. For example, when competing against a first fantasy team having a first defense, fantasy team 1202-1 may draw from a first set of sub pools 1306-1 of video clips for its players. When competing against a second fantasy team having a second different defense, fantasy team 1202-1 may draw from a second different subset 1306-2 of sub pools of video clips for its players. In some implementations, different combinations of sub pools of clips may be used. For example, in a fantasy football implementation, a first fantasy team's defense may be strong against the run, but weak against the pass. In such a circumstance, a second fantasy team at competing against the first fantasy team, system 920 may randomly choose from a first sub pool 1306 of video clips for its running back players and a second sub pool of video clips for its quarterback or receivers. The first sub pool of clips 1306 may be a portion of the total number of clips for the running back where the running back competed against stronger run defenses in the historical competitions/games. The second sub pool 1306 of clips may be a portion of the total number of clips for a wide receiver or running back where the wide receiver or running back competed against weaker pass defenses in the historical competition/games.

With mode 1200, the number of video clips randomly drawn for each player on a fantasy team is based upon or limited by the duration of the simulated competition in which the particular player is involved. For example, the video clips drawn from a first participant in a simulated competition may involve multiple different players, players other than the particular player on a fantasy team. Not all the clips drawn for a simulated competition will necessarily depict the particular fantasy player. For example, the duration of a simulated competition may result in 40 clips being randomly chosen for the participant or team of a fantasy team player. Only 10 of those randomly chosen clips may actually depict the particular fantasy player. In mode 1200, the number of clips randomly drawn for a particular player may be inherently limited based upon the duration of a simulated competition in the overall number of clips drawn for the simulated competition.

In contrast, with mode 1300, there are no simulated competitions. Instead, the number of clips randomly chosen and drawn from the particular pool or sub pool of clips for the particular fantasy player may be limited to a predefined quantity. The predefined quantity may be established by the user via the input. In some implementations, the number of clips may be predefined to have a maximum or minimum based upon the particular position of the player. For example, a quarterback may have a higher number of clips drawn relative to a running back in a fantasy football game. In some implementations, the number of clips randomly chosen and drawn from the pool or sub pool of video clips for a particular player may be random.

In yet other implementations, the number of clips randomly chosen and drawn from a pool or sub pool of clips for the particular player may be based upon historical statistical averages or trends for the particular player's involvement in a competition. For example, the number of video clips randomly drawn or chosen from a pool or sub pool of video clips for the particular player for a single simulated fantasy competition may be based upon the average number of offensive touches or actions by the player in a game. In a fantasy football game, a particular running back player may average a certain number of carries and a certain number of catches per game. A particular quarterback may average a certain number of carries and a certain number of past attempts per game. A particular receiver or tight end may average a certain number of carries per game and a certain number of pass targets per game. Such averages may be based upon results from a single season, a time period including multiple seasons or a player's career. The number of randomly drawn or chosen video clips for the particular player for a simulated fantasy competition may correspond to the above noted average or may be based upon the above noted average.

As with mode 1200, each randomly chosen video clip depicting a particular player will have a partial result contribution that contributed to the final result of the historical competition. In some implementations, a video clip may depict a video clip of a player which has a partial result contribution of zero. For example, with respect to a fantasy football competition, a randomly chosen video clip may depict an incomplete pass. With respect to a fantasy basketball game, a random chosen video clip may depict a missed shot. With respect to a fantasy baseball game, randomly chosen video clip may depict an out (a strikeout, a caught flyball or the like).

As discussed above with respect to mode 1200, the partial result contribution PR for a particular video clip CL may have a corresponding fantasy point value. During a particular matchup between fantasy teams, such as fantasy teams 1202-1 and 1202-2, system 920 may present a running score RS for each of the players on each of the two fantasy teams 1202 as the video clips are being consecutively presented. System 920 may further present a current total running score TS for each of the two fantasy teams 1202, the total running score being a sum of the individual running scores RS for the fantasy players on each fantasy team 1202.

In the example illustrated, in both fantasy modes 1200 and 1300, a separate channel or stream of video clips is presented for each of the fantasy teams in the league. In each stream for a particular fantasy team, only those video clips depicting players on the particular fantasy team are presented. In other implementations, a single stream may present all of the video clips that depict players from either of the two fantasy teams 1202 that are competing against one another. Similar to the other streams described above, in some implementations, the streams may include added commercials targeted to the individual person to establish the fantasy football teams or generic commercials.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A method for generating and presenting a video of a simulated competition between a first participant and a second participant, the method comprising:

randomly selecting a first video clip of a first historical competition involving the first participant, the first video clip having an associated first partial result contribution to a final result of the first historical competition;

randomly selecting a second video clip of a second historical competition, different than the first historical competition and involving the second participant, the second video clip having an associated second partial result contribution to a final result of the second historical competition;

presenting the second video clip to a recipient; and presenting a current result for the simulated competition, the current result comprising relative scores for the first participant and the second participant, wherein the relative scores indicate a currently winning participant of the simulated competition as between at least the first participant and the second participant, the current result being based at least in part upon the first partial result contribution and the second partial result contribution.

2. The method of claim 1, wherein the first video clip having the associated second partial contribution serving as a basis of the current result of the simulated competition is not presented to the recipient as part of the video of the simulated competition.

3. The method of claim 2 further comprising:

randomly selecting a third video clip of a third historical competition involving the second participant, the third video clip having an associated third partial result contribution to a final result of the third historical competition;

presenting the third video clip to the recipient; and proximate to the presenting of the third video clip to the recipient, presenting a second current result for the simulated competition, the second current result being based at least in part upon the first partial result contribution, the second partial result contribution and the third partial result contribution.

4. The method of claim 3 further comprising:

randomly selecting a fourth video clip of a fourth historical competition involving the second participant, wherein the third video clip is presented immediately following the second video clip and wherein the second current result is based at least in part upon the first partial result contribution, the second partial result contribution, the third partial result contribution, and the fourth partial result contribution.

5. The method of claim 3 further comprising:

presenting the first video clip and the third video clip, in succession, to a second recipient;

presenting the second current result for the simulated competition, the second current result being based at least in part upon the first partial result contribution, the second partial result contribution and the third partial result contribution.

6. The method of claim 4 further comprising:

immediately following or preceding the presenting of the second video clip to the recipient, presenting a first commercial clip based upon a characteristic of the recipient; and immediately following or preceding the presenting of the third video clip to the second recipient, presenting a second commercial clip, different than the first commercial clip, based upon a characteristic of the second recipient.

7. The method of claim 4 further comprising:
randomly selecting a fifth video clip of a fifth historical competition involving the second participant, the fifth video clip having an associated fifth partial result contribution a final result of the fifth historical competition; and
concurrently presenting the fifth video clip to the first participant and the second participant; and
presenting the third current result for the simulated competition, the third current result being based at least in part upon the first partial result contribution, the second partial result contribution, the third partial result contribution, the fourth partial result contribution and the fifth partial result contribution.

8. The method of claim 6, wherein the fifth video clip forms an endpoint of the simulated competition.

9. The method of claim 1, wherein the first video clip depicts an offensive possession of the first participant in the first historical competition and wherein the second video clip depicts an offensive possession of the second participant in the second historical competition.

10. The method of claim 1 further comprising:
randomly selecting a third video clip from a third historical competition involving the first participant, the third video clip being associated with a partial result contribution to a final result of the third historical competition;
serially joining the third video clip to the first video clip, wherein the current result being based at least in part upon the first partial result contribution, the second partial result contribution and the third partial result contribution.

11. The method of claim 1, wherein the current result comprises a first running score for the first participant and a second running score for the second participant.

12. The method of claim 1, wherein the current result comprises a first score for the first participant and a second score for the second participant, wherein the first score is based upon the first partial result contribution from the first video clip from a first video of the first historical competition between the first participant and a first competitor, different than the second participant, and wherein the second score is based upon the second partial result contribution from the second video clip from a second video of the second historical competition between the second participant and a second competitor, different than the first participant.

13. The method of claim 1, wherein the current result comprises a score for each participant of a group of competing participants competing directly against one another as part of the simulated competition.

14. The method of claim 1 further comprising:
serially joining the first video clip and the second video clip to form a composite video of the simulated competition;
reading the composite video to broadcast the second video clip and the current result to the recipient; and
reading the composite video to broadcast the first video clip and a second current result to the second recipient concurrent with the broadcasting of the second video clip and the current result to the recipient, the second current result comprising relative scores for the first participant and the second participant, wherein the relative scores indicate a currently winning participant of the simulated competition as between at least the first participant and the second participant, the second current result being based at least in part upon the first partial result contribution.

15. The method of claim 1 further comprising:
filtering those video clips of the simulated competition that depict players on preestablished fantasy teams;
assigning fantasy score values for the players based upon partial result contributions associated with the filtered video clips; and
determining a total score for a fantasy team based on a sum of the fantasy score values for the players on the fantasy team.

16. A method for generating and presenting a video of a simulated fantasy competition between fantasy teams, the method comprising:
randomly selecting video clips from different historical competitions depicting players from different participants in the different historical competitions;
assigning fantasy point values to the players based upon the partial result contributions associated with the randomly selected video clips, the partial result contributions contributing to a final result of the respective historical competitions; and
tallying fantasy team score between the fantasy teams based upon a sum of the fantasy point values of those players and each of the fantasy teams.

* * * * *